US010282782B2

(12) United States Patent
Messina et al.

(10) Patent No.: US 10,282,782 B2
(45) Date of Patent: May 7, 2019

(54) DISTRIBUTED SPREADING TOOLS AND METHODS

(71) Applicant: Trading Technologies International, Inc., Chicago, IL (US)

(72) Inventors: Patricia A. Messina, Chicago, IL (US); Bharat Mittal, Schaumburg, IL (US)

(73) Assignee: Trading Technologies International, Inc., Chicago, IL (US)

( * ) Notice: Subject to any disclaimer, the term of this patent is extended or adjusted under 35 U.S.C. 154(b) by 367 days.

(21) Appl. No.: 13/675,592

(22) Filed: Nov. 13, 2012

(65) Prior Publication Data
US 2014/0136384 A1     May 15, 2014

(51) Int. Cl.
| | |
|---|---|
| *G06Q 20/00* | (2012.01) |
| *G06Q 40/00* | (2012.01) |
| *G06Q 40/04* | (2012.01) |
| *G06Q 40/06* | (2012.01) |
| *G06Q 20/10* | (2012.01) |

(52) U.S. Cl.
CPC ................... *G06Q 40/04* (2013.01)

(58) Field of Classification Search
CPC ......... G06Q 40/04; G06Q 40/06; G06Q 40/40
USPC ......................................................... 705/37
See application file for complete search history.

(56) References Cited

U.S. PATENT DOCUMENTS

| | | | |
|---|---|---|---|
| 7,890,412 B2 | 2/2011 | Morano et al. | |
| 2006/0265322 A1* | 11/2006 | Burns | 705/37 |
| 2009/0089202 A1* | 4/2009 | Rowley | 705/37 |
| 2009/0204535 A1 | 8/2009 | Lutnick et al. | |
| 2009/0204694 A1 | 8/2009 | Kaneko | |
| 2009/0210337 A1* | 8/2009 | Mahoney et al. | 705/37 |
| 2009/0299890 A1* | 12/2009 | Kontos et al. | 705/37 |
| 2012/0016786 A1* | 1/2012 | Mintz et al. | 705/37 |

OTHER PUBLICATIONS

EIC Email Search Request for U.S. Appl. No. 13/675,592, dated Jul. 7, 2018, 1 page.*
EIC Search Results for U.S. Appl. No. 13/675,592, dated Jul. 7, 2018, 42 pages.*
International Search Report of International Application No. PCT/US2013/064869, dated Nov. 5, 2014 (mailed Nov. 20, 2014).

* cited by examiner

*Primary Examiner* — Hai Tran
(74) *Attorney, Agent, or Firm* — McDonnell Boehnen Hulbert & Berghoff LLP

(57) ABSTRACT

Certain embodiments provide systems, methods, and apparatus for trading in a distributed server architecture. An example method includes receiving, by a computing device, a definition for a trading strategy, wherein the trading strategy includes a first tradeable object and a second tradeable object. The example method includes selecting, by the computing device, a first server to process one or more trade orders for the first tradeable object and a second server to process one or more trade orders for the second tradeable object. The example method includes sending, by the computing device, the definition for the trading strategy to the first server and the second server.

16 Claims, 21 Drawing Sheets

DISTRIBUTED SPREADING TOOLS AND METHODS

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

In addition to trading single items, a user may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

BRIEF DESCRIPTION OF THE DRAWINGS

Certain embodiments are disclosed with reference to the following drawings.

Figure 1:
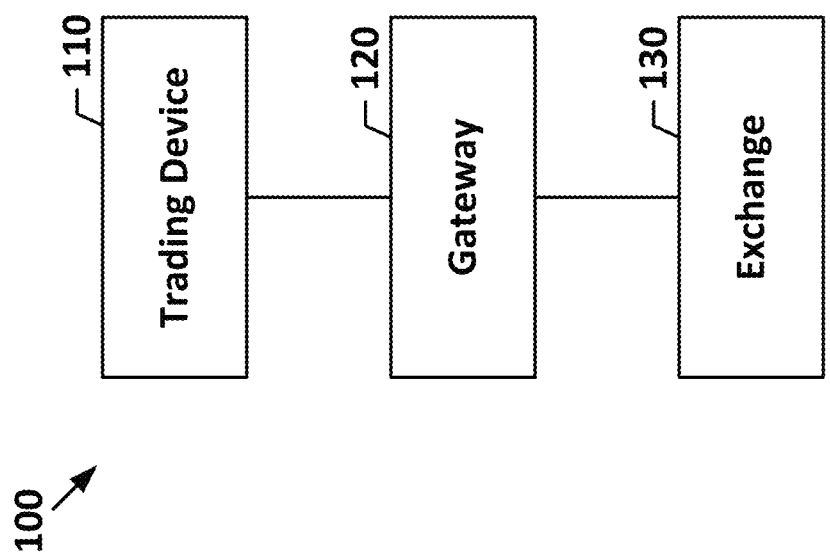
FIGS. 1-2 illustrate block diagrams of example electronic trading systems in which certain embodiments may be employed.

Certain embodiments will be better understood when read in conjunction with the provided drawings, which illustrate examples. It should be understood, however, that the embodiments are not limited to the arrangements and instrumentality shown in the attached drawings.

DESCRIPTION

I. Brief Description of Certain Embodiments

The disclosed embodiments relate to systems and methods for spread trading in a distributed server architecture.

The present embodiments relate to electronic trading. In addition to trading single items, a trader may trade more than one item according to a trading strategy. A trading strategy may define a relationship between two or more items to be traded. Each item in a trading strategy may be referred to as a leg of the trading strategy. Once defined, items in the trading strategy may then be traded together according to the defined relationship. One trading strategy is a spread. Trading according to a spread may also be referred to as spread trading. Spread trading may attempt to capitalize on changes or movements in the relationships between the items in the trading strategy, for example.

Certain embodiments relate to placing an order according to a trading strategy, which may also be referred to as "a trading strategy order," with multiple quoting legs using a distributed server side device architecture. A trading device may split the trading strategy order into multiple child trading strategy orders, for example. These child trading strategy orders may be referred to as "child orders." Each child order is worked according to a child trading strategy having a single quoting leg or a reduced number of quoting legs (for example, relative to the initial trading strategy order). The child trading strategies are the same or substantially the same as the trading strategy in the trading strategy order except for the number of legs marked as quoting legs. Accordingly, each child order may be associated with a single quoting leg or fewer quoting legs than the trading strategy order. The trading device may send the child orders to be adapted to work orders with exchange systems. Server devices receive the child orders, generate quoting order for each of the quoting legs in the child orders, and submit the quoting orders. The quoting orders are submitted and worked with the exchange systems, for example.

Traditionally, spreads have been worked in one location, ideally running on a server platform as close to an exchange as possible. A server such as an Autospreader™ Strategy Engine (ASE) from Trading Technologies International, Inc., of Chicago, Ill., may manage the spread, for example. The ASE or other trading strategy engine (TSE) may be located on a server that is at a physical location near the exchange, for example. When all of the legs in the spread are traded at the same exchange, the close proximity to the exchange allows the trading strategy engine to manage the spread with less communication latency (e.g., relative to a trading strategy engine that is located further away from the exchange). Generally, this improves the performance of a trading strategy, which correlates to a savings in time.

In some instances, traders create and trade synthetic spreads that span different exchanges (e.g., not all of the legs are traded at the same exchange). A synthetic spread is a spread that is not listed on an exchange. The definition/explanation of a synthetic spread should include a description that although the synthetic spread is generated by the trader (e.g., by selecting tradeable objects that he or she wants to spread), a similar spread may be listed at the exchange.

Since a synthetic spread can span different exchanges, a single trading strategy engine may no longer provide the location advantage for each of the legs. The trading strategy engine may be near one of the exchanges but as a result is geographically far away from the other exchanges, for example. In certain embodiments, two or more different servers may manage the various legs of a spread, depending on the location of the server(s) relative to the location of the exchange.

It is noted that the following embodiments are described with respect to a spread; however, the following embodiments may be used for any trading strategy.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

Certain embodiments provide systems, methods, and apparatus for trading in a distributed server architecture.

Certain embodiments provide a method including receiving, by a computing device, a definition for a trading strategy, wherein the trading strategy includes a first tradeable object and a second tradeable object. The example method includes selecting, by the computing device, a first server to process one or more trade orders for the first tradeable object and a second server to process one or more trade orders for the second tradeable object. The example method includes sending, by the computing device, the definition for the trading strategy to the first server and the second server.

Certain embodiments provide a method including receiving, by a computing device, a definition for a trading strategy, wherein the trading strategy includes a first tradeable object and a second tradeable object. The example method includes selecting, by the computing device, a first server to process one or more trade orders for the first tradeable object and a second server to process one or more trade orders for the second tradeable object. The example method includes selecting, by the computing device, either the first server or the second server as a control server that reports synthetic trade order data to a trading device. The example method includes notifying, by the computing device, the first server or the second server that was selected as the control server.

Certain embodiments provide a system including a computing device to facilitate definition of a trading strategy, wherein the trading strategy includes a first tradeable object and a second tradeable object. The example computing device is to select a first server to process one or more trade orders for the first tradeable object and a second server to process one or more trade orders for the second tradeable object. The example computing device is to send the definition for the trading strategy to the first server and the second server.

Certain embodiments provide a system including a computing device to facilitate definition of a trading strategy, wherein the trading strategy includes a first tradeable object and a second tradeable object. The example computing device is to select a first server to process one or more trade orders for the first tradeable object and a second server to process one or more trade orders for the second tradeable object. The example computing device is to send the definition for the trading strategy to the first server and the second server. The example computing device to select one of the first server and the second server as a control server to report synthetic trade order data. The computing device is to notify the first server or the second server selected as the control server.

Certain embodiments provide a tangible computer readable storage medium including a set of instructions for execution by a processor, the set of instructions, when executed, implement a method. The example method includes receiving a definition for a trading strategy, wherein the trading strategy includes a first tradeable object and a second tradeable object. The example method includes selecting a first server to process one or more trade orders for the first tradeable object and a second server to process one or more trade orders for the second tradeable object. The example method includes sending the definition for the trading strategy to the first server and the second server.

Certain embodiments provide a tangible computer readable storage medium including a set of instructions for execution by a processor, the set of instructions, when executed, implement a method. The example method includes receiving a definition for a trading strategy, wherein the trading strategy includes a first tradeable object and a second tradeable object. The example method includes selecting a first server to process one or more trade orders for the first tradeable object and a second server to process one or more trade orders for the second tradeable object. The example method includes selecting either the first server or the second server as a control server that reports synthetic trade order data to a trading device. The example method includes notifying the first server or the second server that was selected as the control server.

II. Example Electronic Trading System

FIG. 1 illustrates a block diagram representative of an exemplary electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available (or not available, for example), there may be "gaps" in market depth.

A tradeable object is anything which may be traded. For example, a certain quantity of the tradeable object may be bought or sold for a particular price. A tradeable object may include financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or any combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. (hereinafter referred to as "Trading Technologies". As another example, the trading device 110 may be a server running a trading application providing automated trading tools such as ADL™, AUTOSPREADER®, and/or AUTO-TRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the IntercontinentalExchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
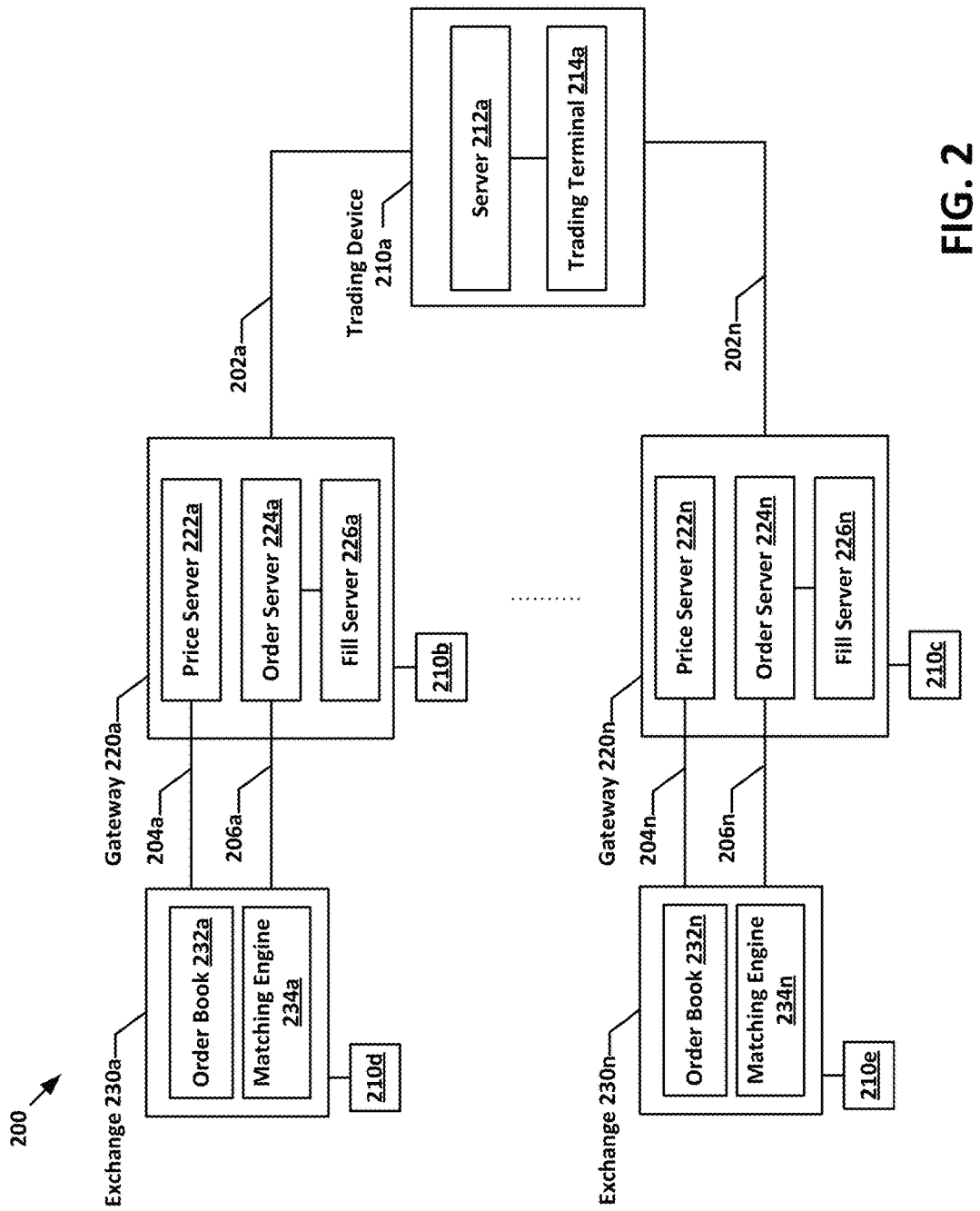

FIG. 2 illustrates a block diagram of another exemplary electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
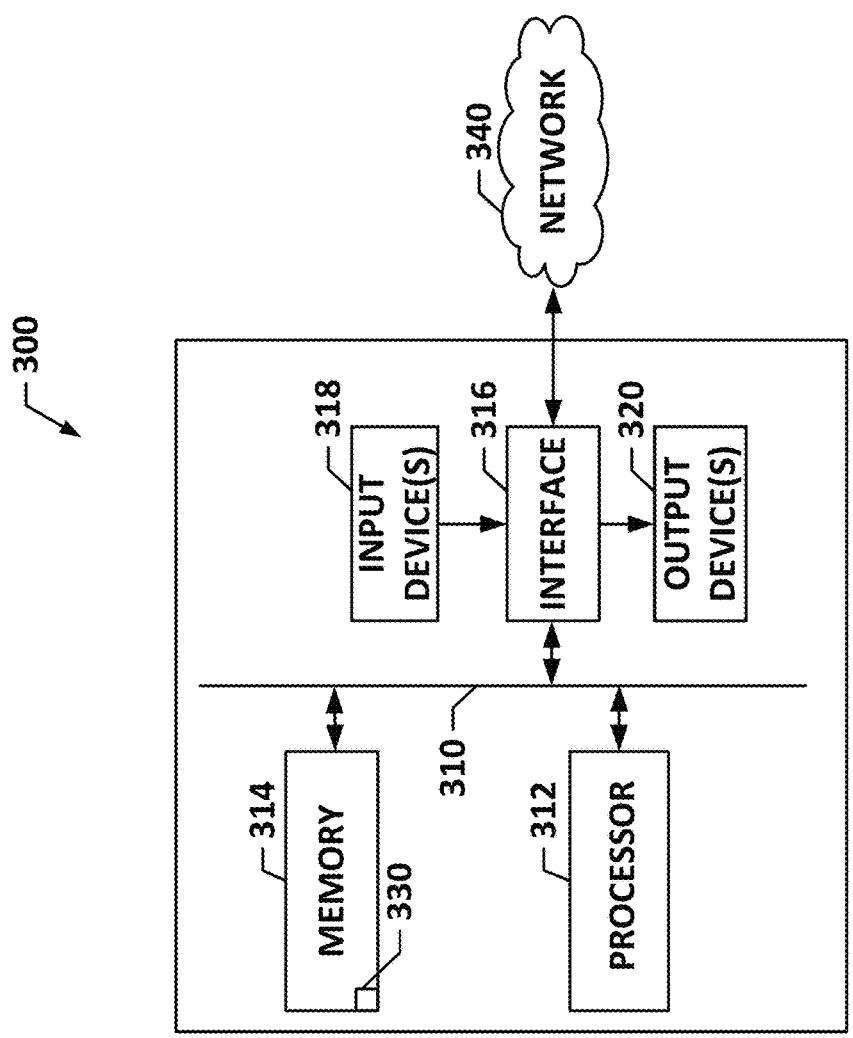
FIG. 3 illustrates a block diagram of an example computing device that may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example. The computing device 300 may include additional, different, or fewer components.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Strategy Trading

In addition to buying and/or selling a single tradeable object, a user may trade more than one tradeable object according to a trading strategy. One trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may be Autospreader™ provided by Trading Technologies International, Inc. of Chicago, Ill.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
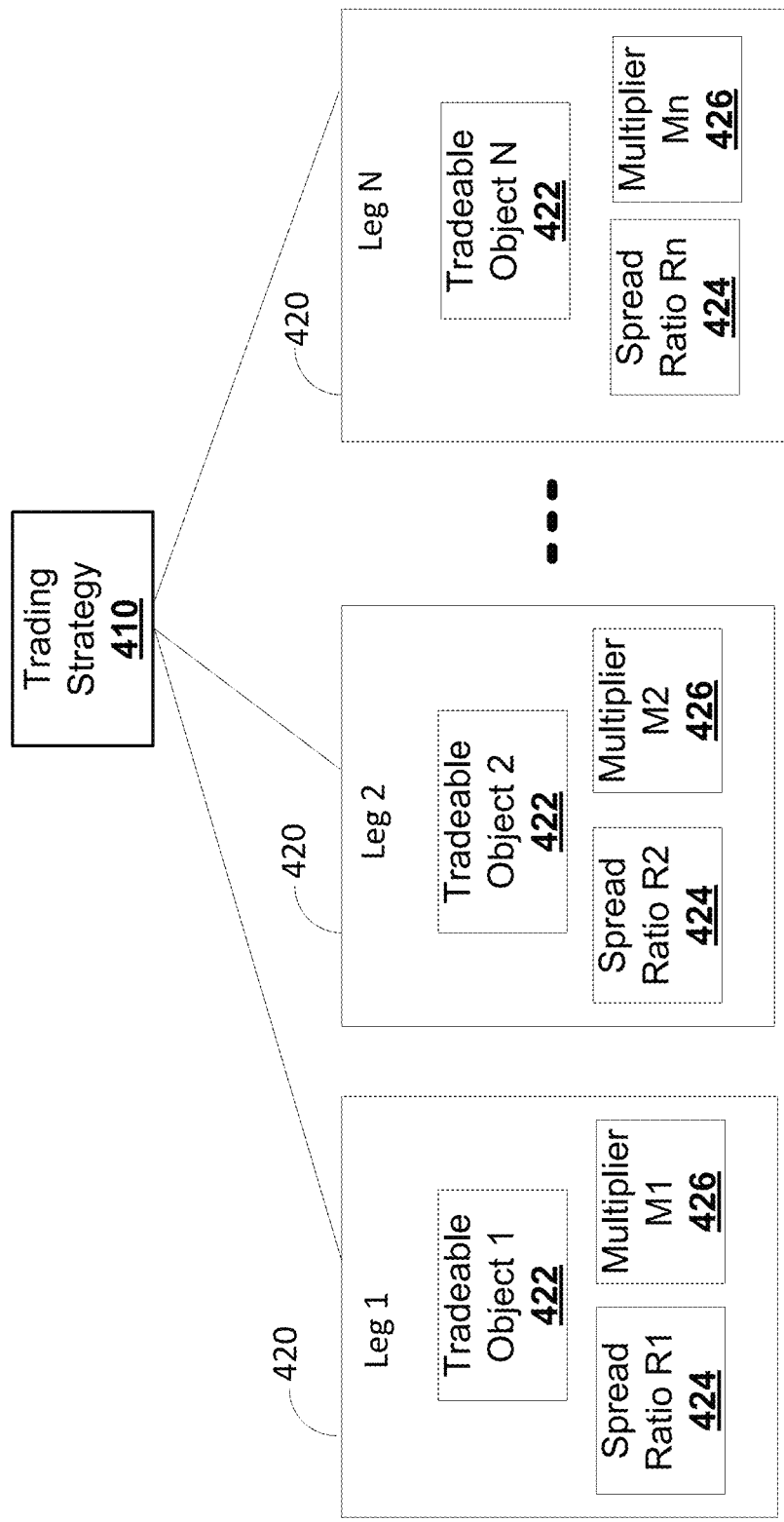
FIG. 4 illustrates a block diagram of a trading strategy which may be employed with certain embodiments of the present inventions.

FIG. 4 illustrates a block diagram of a trading strategy 410 which may be employed with certain embodiments of the present inventions. The trading strategy 410 includes "N" legs 420. The trading strategy 410 defines the relationship between the tradeable objects 422 for each of the legs 420 using the spread ratios 424 and multipliers 426 associated with each of the legs 420.

Once defined, the tradeable objects 422 in the trading strategy 410 may then be traded together according to the defined relationship. For example, assume that the trading strategy 410 is a spread with two legs 420. Leg 1 is for tradeable object A and Leg 2 is for tradeable object B. In addition, assume that the spread ratios 424 and multipliers 426 associated with Legs 1 and 2 are "1" and "−1," respectively. That is, the spread 410 is defined such that when the spread 410 is bought, 1 unit of tradeable object A is bought (positive spread ratio, same direction as the spread) and 1 unit of tradeable object B is sold (negative spread ratio, opposite direction of the spread). As mentioned above, typically in spread trading the opposite of the definition applies. That is, when the definition for the spread 410 is such that when the spread 410 is sold, 1 unit of tradeable object A is sold (positive spread ratio, same direction as the spread) and 1 unit of tradeable object B is bought (negative spread ratio, opposite direction of the spread).

The price for the trading strategy 410 is determined based on the definition. In particular, the price for the trading strategy 410 is typically the sum of price of the tradeable object 422 multiplied by the multiplier 426 for each of the legs 420 of the trading strategy 410. The price for a trading strategy may be affected by price tick rounding and/or pay-up ticks. However, both of these implementation details are beyond the scope of this discussion and are well-known in the art.

Recall that, as discussed above, a real spread may be listed at an exchange, such as exchange 140 and/or 240, as a tradeable product. In contrast, a synthetic spread may not be listed as a product at an exchange, but rather the various legs of the spread are tradeable at one or more exchanges. For the purposes of the following discussion, the trading strategy 410 is discussed as a synthetic trading strategy. However, similar techniques to those discussed below may also be applied by an exchange when a real trading strategy is being traded.

Continuing the example from above, if it is expected or believed that tradeable object A typically has a price 10 greater than tradeable object B, then it may be advantageous to buy the spread whenever the difference in price between tradeable objects A and B is less than 10 and sell the spread whenever the difference is greater than 10. As an example, assume that tradeable object A is at a price of 45 and tradeable object B is at a price of 40. The current spread price may then be determined to be (1)(45)+(−1)(40)=5, which is less than the typical spread of 10. Thus, a user may buy 1 unit of the spread, which results in buying 1 unit of tradeable object A at a price of 45 and selling 1 unit of tradeable object B at 40. At some later time, the typical price difference may be restored and the price of tradeable object A is 42 and the price of tradeable object B is 32. At this point, the price of the spread is now 10. If the user sells 1 unit of the spread to close out his position (that is, sells 1 unit of tradeable object A and buys 1 unit of tradeable object B), he has made a profit on the total transaction. In particular, while the user bought tradeable object A at a price of 45 and sold at 42, losing 3, the user sold tradeable object B at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread 410 to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price).

The leg(s) for which the order is placed is (are) referred to as the quoting leg(s). The other leg(s) is (are) referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, the orders in the other quoted legs are typically cancelled and then appropriate hedge orders are placed based on the leaned on prices that the filled leg was based on.

When buying and selling trading strategies, users generally desire to achieve the target price for the trading strategy. That is, traders want to buy and sell, according to the definition of the trading strategy, the tradeable objects of the trading strategy so as to result in a particular strategy price being realized.

To achieve the target price for the trading strategy, as markets fluctuate, there may be a need to re-quote one or more of the quoting legs based on a fluctuating price of a hedge leg. For example, in the event that the price of a hedge leg being worked at a first exchange fluctuates, the order for a quoting leg at a second exchange may need to be cancelled and replaced with a replacement order having a replacement quoting leg definition. The replacement quoting leg definition generally sets forth a new price for the quoting leg based on the new price for the hedge leg.

Figure 5A:
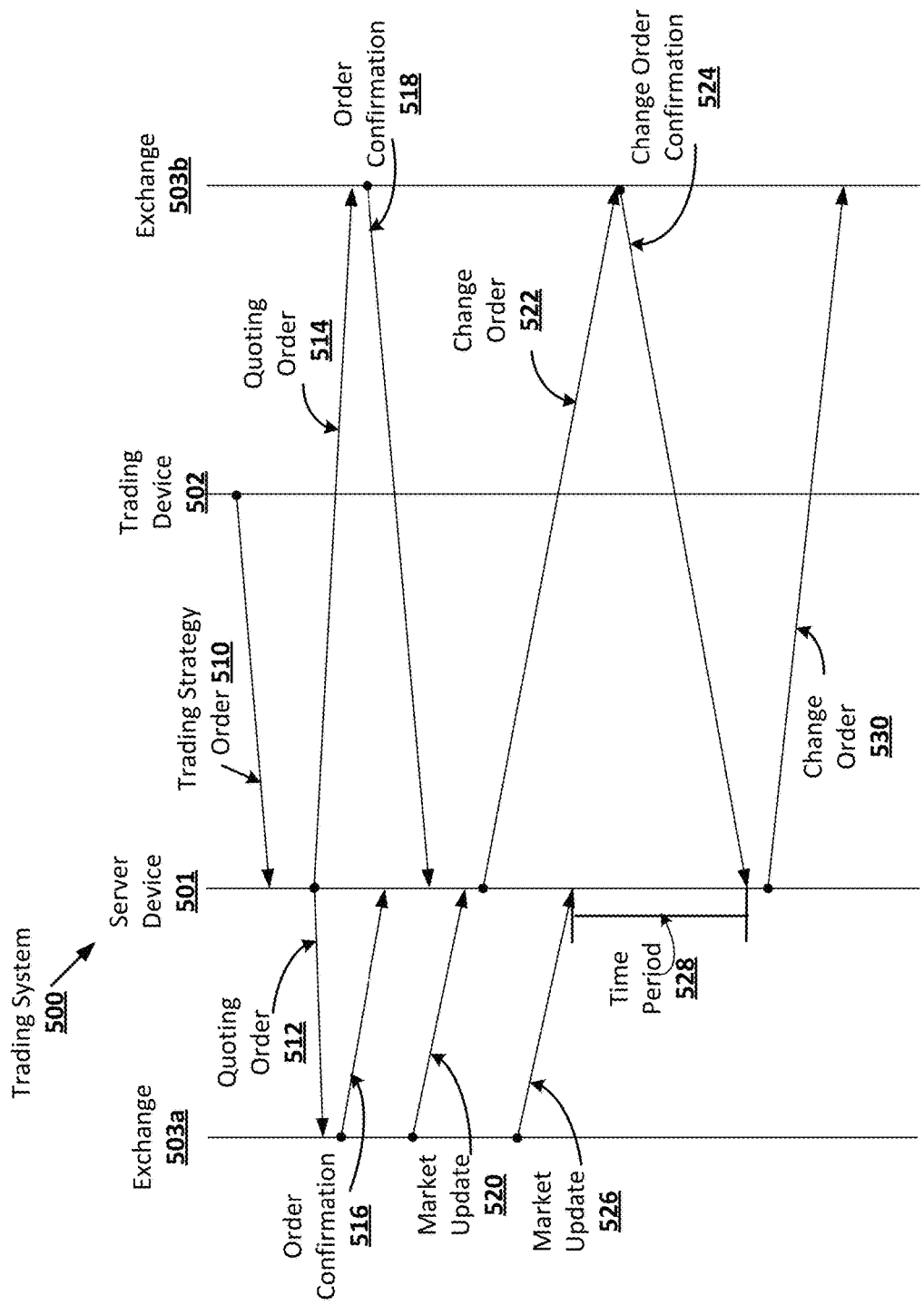
FIGS. 5A-5B illustrate an example of an electronic trading process using an example electronic trading system.

FIG. 5A illustrates an example of working an order for a quoting leg based on a fluctuating price of a hedge leg. A trading system 500, which may include one or more components of or similar to the system 200 of FIG. 2, may be used to work the order. For example, the trading system 500 includes a server 501 at, near, or in an exchange 503a. However, suppose a server is not located at, near, or in an exchange 503b. Instead, the server 501 is adapted to work quoting orders at both the exchange 503a and exchange 503b. The trading system 500 includes a trading device 502 to submit orders to the server 501.

The system 500 is configured so that a single server 501 is used to work the quoting orders. This configuration allows the server 501 to act as a central hub for all of the quoting orders. That is, the server 501 manages each of the orders based on the status or changes to orders at each of the exchange systems.

The trading system 500 is adapted to facilitate the electronic trading of an order to buy or sell according to a trading strategy, which is referred to as a trading strategy order 510. In this example, both leg A and leg B are marked as quoting legs. As shown in FIG. 5A, the server 501 receives the trading strategy order 510 from the trading device 502. The trading strategy order 510 is associated with a trading strategy including leg A and leg B. Leg A is associated with tradeable object A, which is electronically traded at exchange 503a, and leg B is associated with tradeable object B, which is electronically traded at exchange 503b. Exchange 503a is a different than exchange 503b.

Once the trading strategy order 510 is received, the server 501 submits a quoting order 512 to the exchange 503a. The quoting order 512 may be an order, for example, configured according to a protocol required by exchange 503a, for leg A. Similarly, the server 501 submits a quoting order 514 to the exchange 503b. The quoting order 514 may be an order, for example, configured according to a protocol required by exchange 503b, for leg B. The quoting order 512 leans on tradeable object B being traded at exchange 503b. Similarly, quoting order 514 leans on tradeable object A being traded at exchange 503a.

Upon receiving the quoting orders 512, 514, the exchanges 503a, 503b confirm receipt of the quoting orders 512, 514 by transmitting order confirmations 516, 518 back to the server 501. Furthermore, the exchanges 503a, 503b begin attempting to match the quoting orders with contra-side orders that have been received or will be received by the exchange systems.

A market update 520 is transmitted to the server 501 from the exchange 503a. The market update 520 includes a price change related to the trading strategy. For example, the market update indicates that the price for tradeable object A, which leg B is leaning on, has changed at the exchange 503a. Accordingly, to achieve the target price for the trading strategy, as originally defined by the client device, the server 501 submits a change order 522 to the exchange 503b. The change order 522 changes the price associated with a quoting order in the order book. The adjusted price value is based on the change in price indicated in the market update 520. The exchange 503b confirms receipt of the change order 522 by sending a change order confirmation 524 to the server 501. Note that in the event that the exchange 503b does not support a change order, the server 501 may send a cancel/replace order or two separate commands to cancel and replace the order in the order book, for example.

Prior to receiving the change order confirmation 524, the server 501 receives another market update 526, for example, indicating another price change impacting the pricing of the trading strategy. However, in some instances, until the change order confirmation 524 is received (for example, during the time period 528), the server 501 is unable to send a change order 530. That is, the change order 530 should not be sent because the server 501 has not received an identifier for the order associated with the change order 522. The exchange 503b places this identifier in the change order confirmation 524 so that the server 501 can reference the correct order when changing, replacing, or cancelling the order. Without this identifier, the server 501 is unable to properly reference the order. Accordingly, the exchange 503b will be unable to identify the correct order and take appropriate action. Furthermore, in other instances, the server 501 must wait for the change order confirmation 524 to ensure that the order at the exchange was properly received and placed in the order book. Plus, there is the possibility that the change was filled.

During the time period 528, the server 501 is aware that the market has changed but is unable to place a change order. It may be advantageous to reduce this time period as much as possible, so that the exchange 503b receives the change order 530 as fast as possible.

Figure 5B:
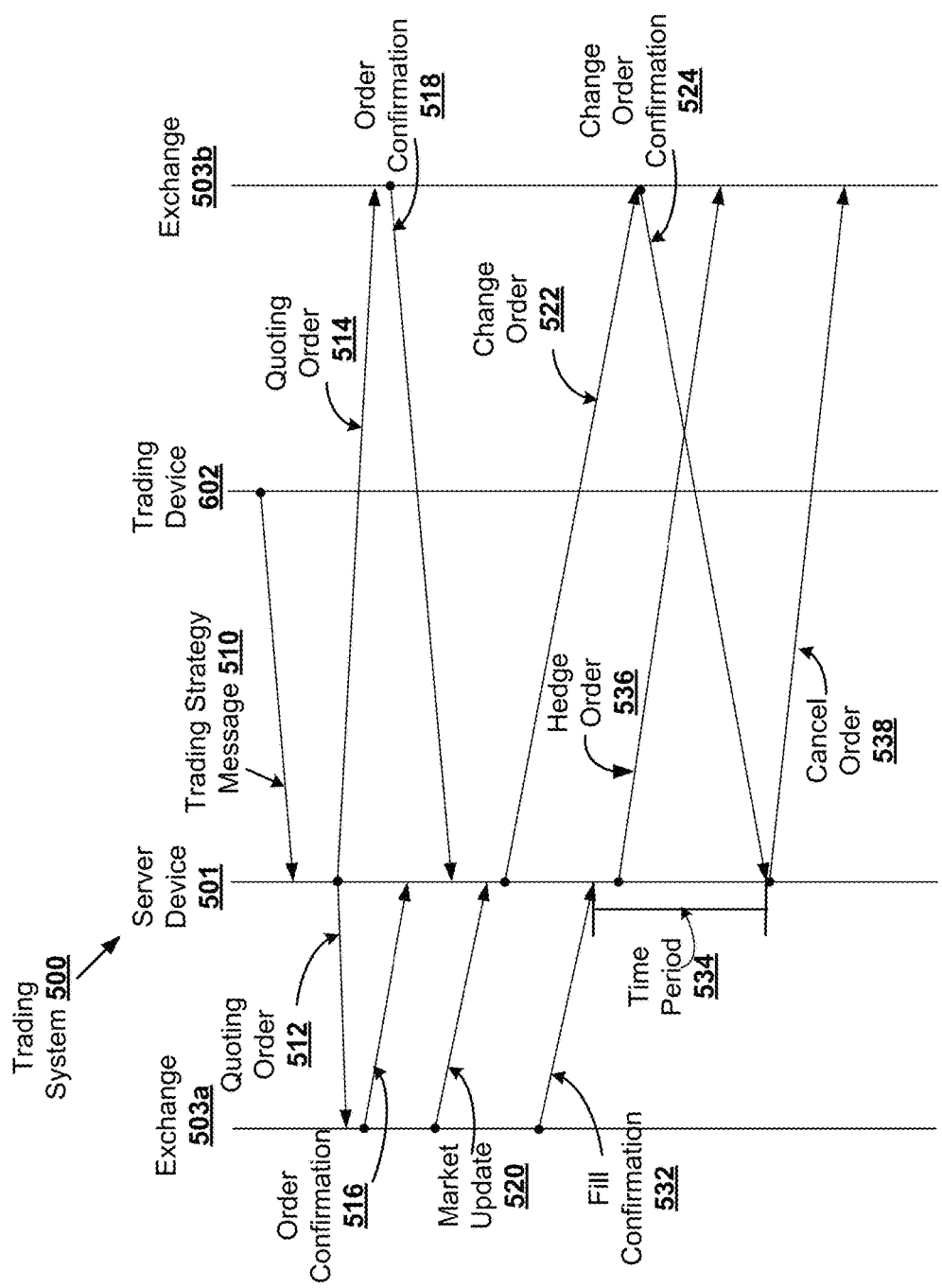

Furthermore, as shown in FIG. 5B, the system 500 leaves the trader at risk of being legged, double filled, or both legged and double-filled for an extended period of time. The system 500 is the same or similar as the system 500 of FIG. 5A. However, instead of the market update 526, prior to receiving the change order confirmation 524, the server 501 receives a fill confirmation 532. The fill confirmation 532 indicates that exchange 503a matched the quoting order 512. In response to receiving the fill confirmation 532, the server 501 attempts to send a hedge order 536 and a cancel order 538 to the exchange 503b. The hedge order 536 places an order for the tradeable object associated with the leg that quoting leg A was leaning on. The cancel order 538 cancels the replacement order for the tradeable object in quoting leg B (for example, the order that was placed as a result of the change order 522).

The hedge order 536 can be placed at any time, for example, subsequent to a fill. For example, as shown in FIG. 5B, the hedge order 536 may be placed after receiving the fill confirmation 532 and prior to receiving the change order confirmation 524. However, in other embodiments, the hedge order 536 may not be placed until the change order confirmation 524 is received and the cancel order 538 is transmitted.

However, the server 501 is unable to place the cancel order 538 until the server 501 receives the change order confirmation 524, since the server 501 needs the confirmation information in the change order confirmation 524 to be able to cancel the change order 522. That is, the server 501 is unable to place the cancel order 538 during the time period 534 because the server 501 is unable to identify the change order 522 at the exchange 503b without the identifier, as discussed above. This may result in a delay in placing the hedge order 536, the cancel order 538, or both the hedge order 536 and cancel order 538. As shown in FIG. 5B, even though the hedge order 536 may not be delayed, the cancel order 538 might be delayed and as a result the user might get double filled or legged.

The risk of being legged arises when the prices needed to obtain the trading strategy are no longer available. For example, a trader is considered to be legged after being filled in leg A and is unable to be filled in leg B at a price that satisfies the trading strategy price. For example, assume that the trading strategy price is "5" and leg A was filled at a price of "10." Since the trading strategy price is equivalent to the price of leg A minus the price of leg B, the trader would need to obtain a price of "5" for leg B. However, if the market moves against the trader (e.g., the price of leg B drops from "5" to "4"), after leg A is filled or while leg A is being filled, the trader is considered to have been legged because the trading strategy price of "5" is no longer available. Furthermore, a trader is at risk of being double filled when both the change order 522 and the hedge order 536 are being worked at the exchange 503b. That is, to obtain the trading strategy price, a hedge order 536 is sent to the exchange 503b when the fill confirmation 526 is received. However, since the server 501 has yet to receive the change order confirmation 524, the change order 522 has not been cancelled. Accordingly, two orders are being worked at exchange 503b. This leaves the trader at risk of being double filled.

VI. Example Electronic Trading Processes

Figure 6A:
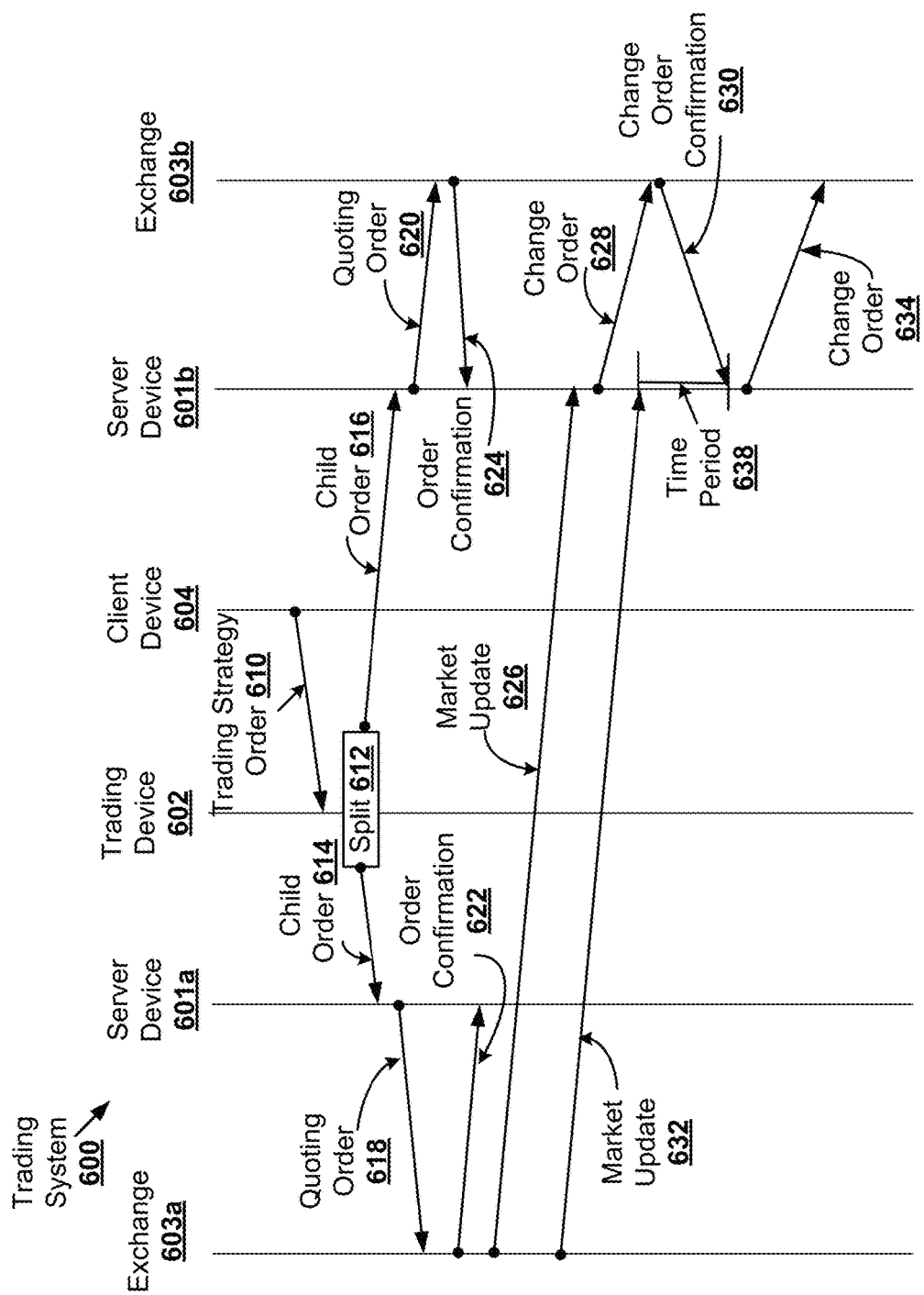
FIGS. 6A-6B illustrate another example of an electronic trading process using an example electronic trading system.

FIG. 6A illustrates an exemplary trading process using a system similar to or the same as the trading system 200 of FIG. 2. A client device 604 is adapted to receive a trading strategy definition. The trading strategy definition defines a trading strategy to be bought or sold. For example, the trading strategy definition may include any of price data, quantity data, configuration data, or any combination thereof. The trading strategy definition may be received from the client device 604. For example, the trading strategy definition may be automatically or manually input by a trader into the client device. In another example, all or some of the trading strategy definition may be received at the same or different times. For example, a trader may define a trading strategy (e.g., define a spread) and send the configuration data to the trading device 602 or the server side devices. Then, during a trading session, the price and quantity information may be defined, for instance, by selecting a price and quantity along a price axis.

The client device 604 may generate a trading strategy order 610, for example, according to the trading strategy definition. Once generated, the client device 604 may send the trading strategy order 610 to the trading device 602. The trading strategy order 610 may be sent at the request from a user (for example, by clicking a "Send" button) or automatically. For example, a trader may utilize an electronic trading workstation to place the trading strategy order. As another example, an automated trading tool may calculate one or more parameters for an order and automatically send the order. In some instances, an automated trading tool may prepare the order to be sent but not actually send it without confirmation from the user.

In some embodiments, the client device 604 may designate the trading device 602 as the recipient of the trading strategy order 610, for example, using an address or communication path allocated to the trading device 602. However, in other embodiments, the trading strategy order 610 may be sent to another device that routes the trading strategy order 610 to the trading device 602.

The trading strategy order 610 may be associated with a trading strategy having multiple quoting legs. For example, the trading strategy order 610 may be associated with a spread having leg A and leg B. Leg A is associated with tradeable object A traded at exchange 603a and leg B is associated with tradable object B traded at exchange 603b. Both leg A and leg B are marked as quoting legs, for example, when the trading strategy is defined using the client device 604. Accordingly, leg A leans on tradeable object B and leg B leans on tradeable object A. Additional quoting legs and/or non-quoting legs may be defined in the trading strategy associated with the trading strategy order 610. The exchange 603a may be different than the exchange 603b.

The trading device 602 may receive the trading strategy order 610. Receiving the trading strategy order 610 may include receiving the trading strategy order 610, requesting, retrieving, or otherwise obtaining the trading strategy order 610.

In various embodiments, as shown in FIG. 6A, the trading strategy device 602 may be disposed between the client device 604 and one, some, or all of servers 601a-b. Accordingly, the trading device 602 may receive the trading strategy order 610 before or at the same time as one, some, or all of the servers 601a-b. For instance, if the trading device 602 is disposed in a client system, the trading device 602 may receive the trading strategy order prior to the server device 601a and server device 601b. However, in the event that the trading device 602 is part of the server device 601a, the trading device 602 may receive the trading strategy order 610 before the server device 601b.

Once received, the trading device 602 may split 612 the trading strategy order 610 into multiple child trading strategy orders 614, 616. Accordingly, the trading strategy order 610 may be referred to as, for example, an initial, original, received, or parent order. The child orders 614, 616 may be referred to as, for example, sub, split, or derivative orders.

Splitting 612 the trading strategy order 610 may include, as discussed in more detail below, identifying a trading strategy with multiple quoting legs, defining multiple child trading strategies, generating multiple child trading strategy orders, submitting the multiple child trading strategy orders, or any combination thereof. Splitting 612 is not limited to those acts described above. Additional, different, or fewer acts may be performed when splitting a trading strategy order.

The trading device 602 is adapted to identify a trading strategy having multiple quoting legs. Identifying a trading strategy order 610 associated with a trading strategy having multiple quoting legs may include recognizing, calculating, or otherwise determining that the trading strategy includes multiple legs marked as quoting legs. For instance, the trading device 602 may analyze each leg in the trading strategy order 610, determine whether each leg is a quoting leg or a non-quoting leg, and count the number of legs that are marked as quoting legs. In another example, the client device 604, for example, when generating the trading strategy order, indicates the number of quoting legs in a field designated for indicating the number of quoting legs in trading strategy order 610. Accordingly, the trading device 602 may read and analyze that field.

In response to identifying a trading strategy order 610 associated with a trading strategy including multiple quoting legs, the trading device 602 may define multiple child trading strategies. The child trading strategies are the same as the trading strategy associated with the trading strategy order 610, except for the number of legs that are being quoted. That is, the number of legs marked as quoting legs in the child trading strategies is different than (e.g., less than) the number of legs marked as quoting legs in the trading strategy associated with the trading strategy order 610. For instance, the child trading strategies may include a single quoting leg or a reduced number of quoting legs (for example, relative to the number of quoting legs in the trading strategy order 610). The child trading strategies are associated with tradeable objects. For example, in FIG. 6A, a first child trading strategy is associated with tradeable object A and a second child trading strategy is associated with tradeable object B. In the first child trading strategy, leg A is marked as a quoting leg. Similarly, in the second child trading strategy, leg B is marked as a quoting leg.

The number of child trading strategies that are defined depends, for example, on the number of quoting legs in the trading strategy order 610. Each child trading strategy may have a single quoting leg. In another example, multiple quoting legs may be included in a single child trading strategy. Quoting legs may be grouped based on the exchange system adapted to match the quoting legs. For example, quoting legs that are traded at the same exchange system may be included in the same child trading strategy. Even when grouped together, the number of quoting legs in the child trading strategy is generally less than the number of quoting legs in the trading strategy order 610. However, in some instances, they are split evenly. For example, splitting an order on two devices to quoting on one and have the legged hedge managed on the other. In this case, there would be one quoting leg in the strategy and one quoting leg in the child strategy.

It should be understood that the present system also supports working a trading strategy order without splitting the trading strategy order. For example, the trading device 602 may receive a trading strategy order 610 for a trading strategy with multiple quoting legs and may send the trading strategy order 610 to the server device 601*a*. That is, the trading device 602 may determine whether or not to split the trading strategy order 610, for example, based on latency, physical location of one or more exchange systems, one or more other considerations that optimize the trading environment, or a combination thereof.

Each child trading strategy has zero, one, or more quoting legs. As mentioned above, the number of quoting legs in the child trading strategies is generally less than the number of quoting legs in the trading strategy of the initial order. In an example, if the trading strategy, as specified in the trading strategy order 610, includes two quoting legs, the trading device 602 may define a first trading strategy having a single quoting leg and a second trading strategy having a single quoting leg. In another example, if the trading strategy, as specified in the trading strategy order 610, includes twenty-two quoting legs, the trading device 602 may define a first trading strategy having a single quoting leg; a second trading strategy having a single quoting leg; and a third trading strategy having twenty quoting legs.

Once one, some, or all the child trading strategies are defined, the trading device 602 generates multiple child trading strategy orders ("child orders") 614, 616. Each child order 614, 616 may include a child trading strategy including a single quoting leg or a reduced number of quoting legs (for example, relative to the number of quoting legs in the trading strategy order received from the client device 604). Any number (for example, two or more) of child orders may be generated, for example, depending on the complexity of the trading strategy in the trading strategy order 610. For instance, the trading device 602 may generate a child order for each quoted leg in the trading strategy associated with the trading strategy order 610. In another example, the trading device 602 may minimize the number of child orders that need to be generated, for example, by grouping child trading strategies. The legs or trading strategies may be grouped, for example, based on latency, physical location of the server side devices or exchange systems or gateways, trader preference, exchange capabilities, other now known or later developed criteria, or any combination thereof. This may reduce the volume of child orders being transmitted through the electronic trading system 600.

All, some, one, or none of the legs in the child orders may be quoting legs. The child orders may have any number of non-quoting legs and/or quoting legs. The number of child orders may depend on, for example, the number of legs in the trading strategy, the number of quoting legs, latency, capabilities of the exchanges, or any combination thereof. The number of non-quoting legs and quoting legs in the child orders may be the same or different. The number of non-quoting legs and quoting legs may or may not vary between child orders. For example, in the child orders, quoting legs may be mixed with other quoting legs or non-quoting legs. However, a single non-quoting leg and quoting leg may, alternatively or additionally, stand alone. The trading device 602 determines the number of child orders, the number of non-quoting legs in each child order, the number of quoting legs in each child order, or a combination thereof based on, for example, latency in submitting the child orders. The trading device 602 may minimize the time for submitting the child orders.

Figure 7:
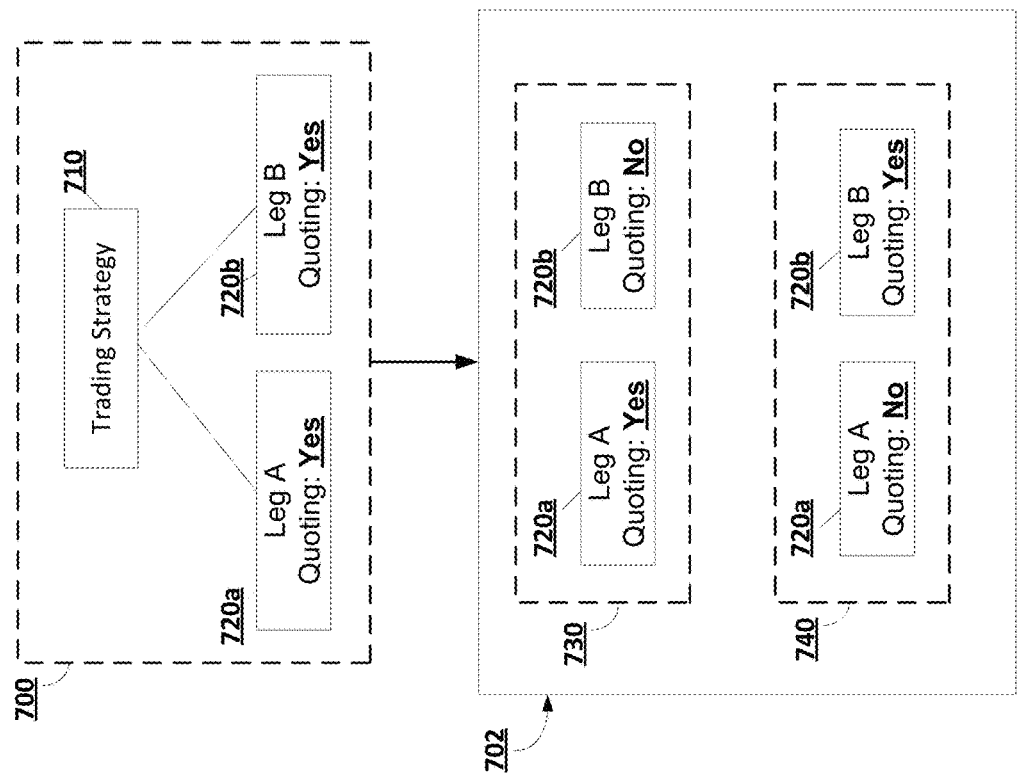
FIG. 7 illustrates an example of splitting a trading strategy order.
Figure 8:
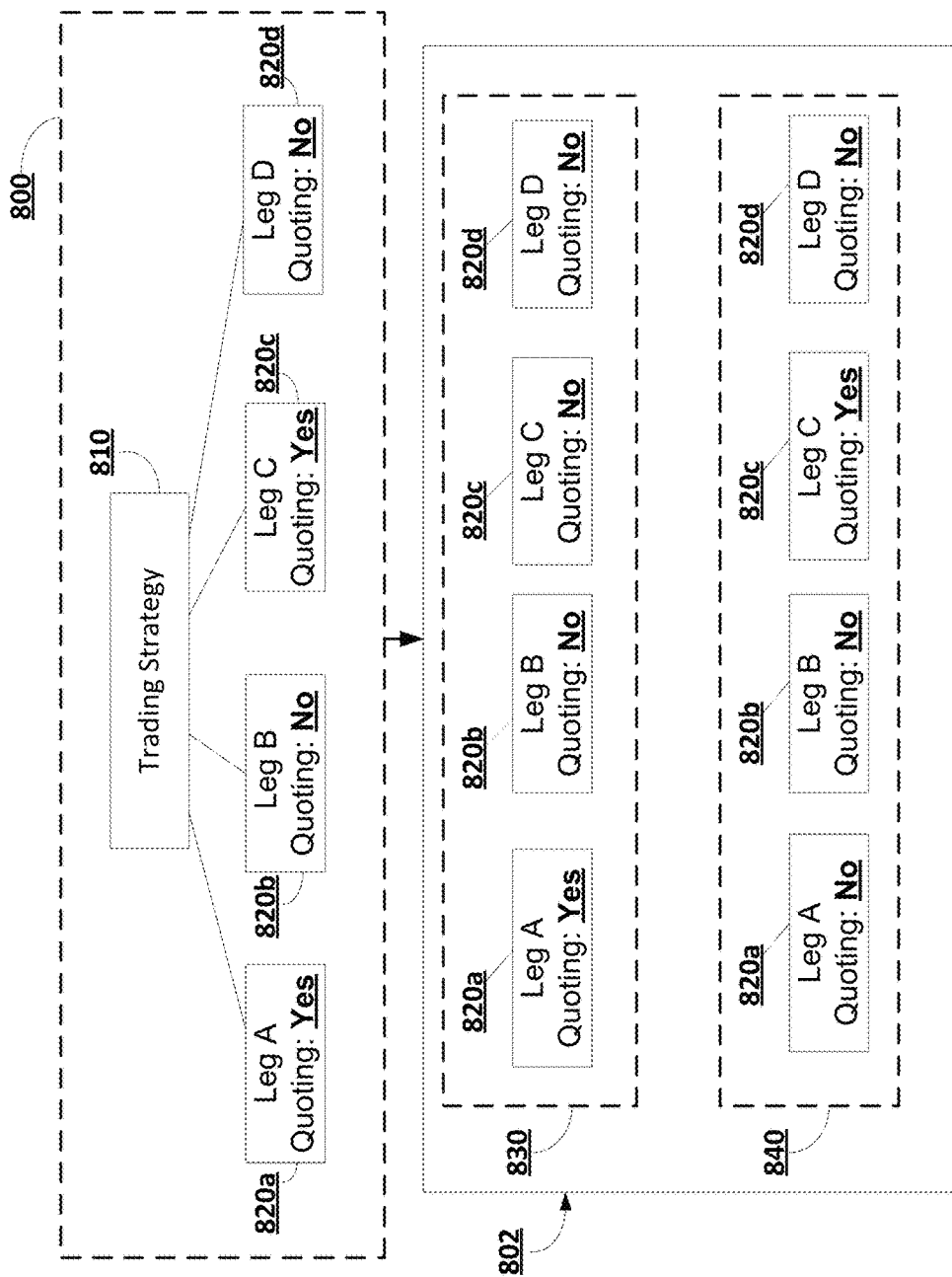
FIG. 8 illustrates another example of splitting a trading strategy order.
Figure 9:
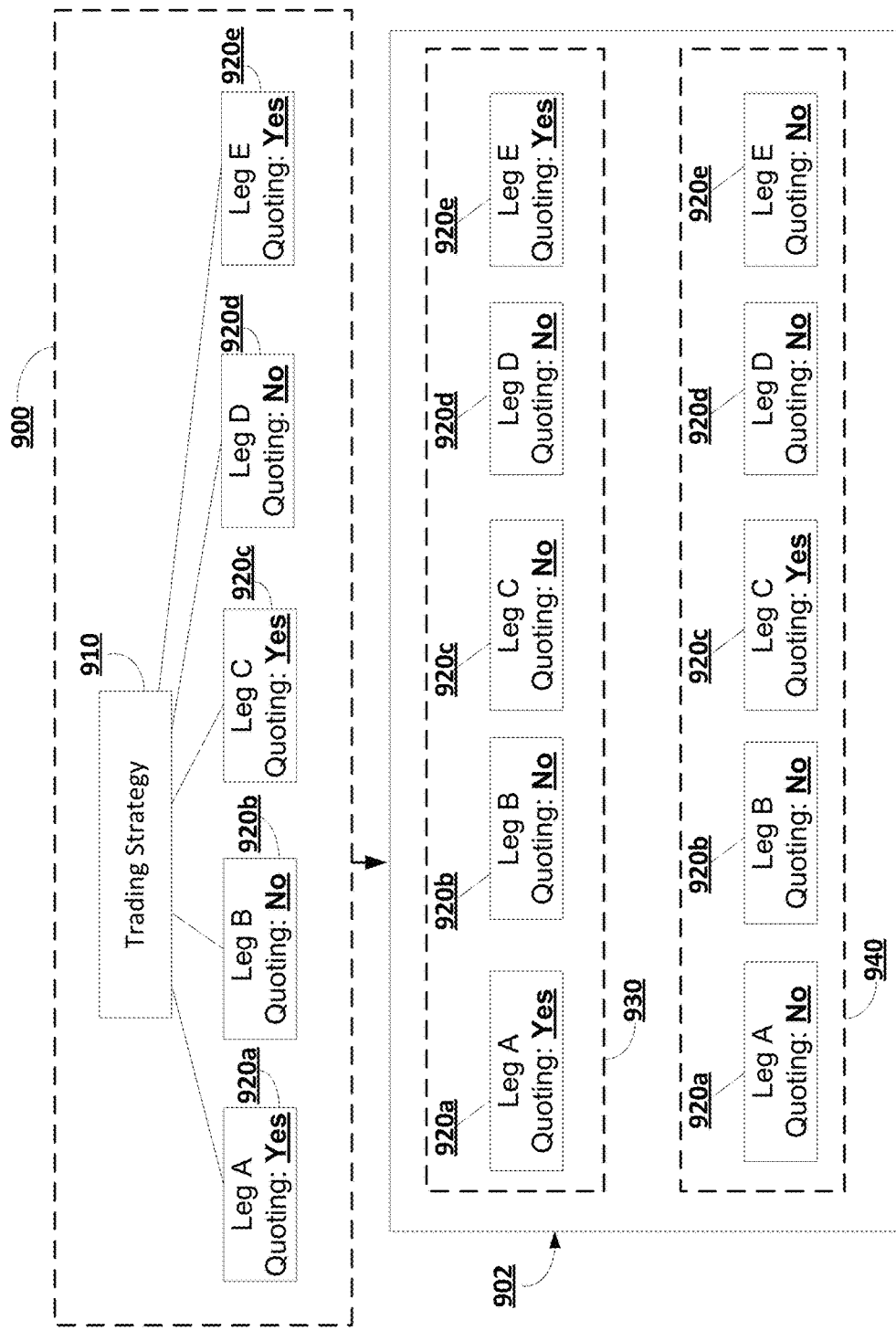
FIG. 9 illustrates yet another example of splitting a trading strategy order.

FIGS. 7-9 illustrate examples of splitting an order including multiple quoting legs. The examples shown in FIGS. 7-9 are non-exhaustive examples. As will be explained in more detail below, FIG. 7 illustrates splitting a trading strategy associated with a trading strategy having two legs into two child orders, where each child order includes a single quoting leg. FIG. 8 illustrates splitting a trading strategy associated with a trading strategy having four legs into two child orders, where each child order includes a single quoting leg. FIG. 9 illustrates splitting a trading strategy associated with a trading strategy having five legs into two child orders, where one of the child orders includes multiple quoting legs and the other child order includes a single quoting leg. Other examples, for example, for different trading strategies, are intended to be included in the scope of this patent document.

FIG. 7 illustrates a trading strategy order 700 for a trading strategy 710 including two quoting legs 720*a* and 720*b*. That is, the order 700 includes multiple quoting legs 720*a* and 720*b*. A trading device 702 may receive the order 700, for example, from a client device. The trading device 702 may analyze the order 700 and identify that the order 700 includes multiple quoting legs or more than one quoting leg. Identifying may include counting the number of legs that are marked as quoting legs.

In FIG. 7, the trading device 702 may determine that the order 700 includes two quoting legs. In response to identifying multiple quoting legs, the trading device 702 may generate a first child order 730 and a second child order 740. In this example, the first child order 730 includes both legs 720*a*, 720*b* but only leg 720*a* is marked as a quoting leg. Leg 720*b* is a non-quoting leg. That is, when generating the first child order 730, the trading device 702 may change the second leg 720*b* from a quoting leg to a non-quoting leg. Similarly, the second child order 740 includes both legs 720*a*, 720*b* but only leg 720*b* is a quoting leg. Leg 720*a* is a non-quoting leg. That is, when the second child order 740 is generated, the trading device 702 may change the first leg 720*a* from a quoting leg to a non-quoting leg. The first child order 730 may be submitted to a first server. The second child order 740 may be submitted to the second server.

The servers may submit quoting orders for each of the quoting legs in the child orders to exchanges where orders for the quoting leg(s) are matched and filled. In this example, a first exchange fills orders for the first leg 720*a* and a second exchange fills orders for the second leg 720*b*. As a result, a first server device (e.g., associated with the first exchange) may work leg 720*a* and a second server device (e.g., associated with the second exchange) may work leg 720*b*.

FIG. 8 illustrates a trading strategy order 800 for a trading strategy 810 including two quoting legs 820*a*, 820*c* and two non-quoting legs 820*b*, 820*d*. A trading device 802 may receive the order 800, for example, from a client device. The trading device 802 may analyze the order 800 and identify that the order 800 includes more than one quoting leg. Identifying may include counting the number of legs that are marked as quoting legs.

The trading device 802 may determine that the order 800 includes two quoting legs 820*a*, 820*c*. In response to identifying multiple quoting legs, the trading device 802 may generate a first child order 830 and a second child order 840. In this example, the first child order 830 includes legs 820*a-d* but only leg 820*a* is marked as a quoting leg. Legs 820*b-d* are marked as non-quoting legs in the first child order 830. The second child order 840 includes legs 820*a-d* but only leg 820*c* is marked as a quoting leg. Legs 820*a*, 820*b*, and 820*d* are marked as non-quoting legs. The first child order 830 may be submitted to a first server device, since orders for the quoting leg 820*a* are filled at a first exchange. The second child order 840 may be submitted to a second server device, since orders for the quoting leg 820*c* are filled at a second exchange.

FIG. 9 illustrates a trading strategy order 900 for a trading strategy 910 including three quoting legs 920*a*, 920*c*, 920*e* and two non-quoting legs 920*b*, 920*d*. In this example, quoting legs 920*a*, 920*e* are matched and filled at the same exchange. Accordingly, a trading device 902 may include quoting legs 920*a*, 920*e* in the same child order. As shown in FIG. 9, the trading device 902 may receive the order 900, for example, from a client device. The trading device 902*a* may analyze the order 900 and identify that the order 900 includes multiple quoting legs or more than one quoting leg. Identifying may include counting the number of legs that are marked as quoting legs.

The trading device 902 may determine that the order 900 includes three quoting legs 920*a*, 920*c*, 920*e*. In response to identifying multiple quoting legs, the trading device 902 may generate a first child order 930 and a second child order 940. In this example, the first child order 930 includes legs 920*a-e* but only legs 920*a*, 920*e* are marked as quoting legs, since legs 920*a*, 920*e* are filled at the same exchange system. Legs 920*b-d* are marked as non-quoting legs in the first child order 930. The second child order 940 includes legs 920*a-e* but only leg 920*c* is marked as a quoting leg. Legs 920*a*, 920*b*, 920*d*, 920*e* are marked as non-quoting legs. The first child order 930 may be sent to a first gateway, since quoting legs 920*a*, 920*e* are filled at a first exchange. The second child order 940 may be submitted to a second server device, since the quoting leg 920*c* is filled at a second exchange.

As an alternative to the example of FIG. 9, the trading device 902 may generate three, different child orders, as opposed to the two child orders. Each child order may include a single quoting leg, which may be associated with a tradeable object. For example, a first, second, and third child order may be associated with first, second, and third tradeable objects, respectively. The first and second tradeable objects are traded at a first exchange system and the third tradeable object may be traded at a second exchange system. Accordingly, the first and second child orders, which are different orders, may be transmitted to the first exchange and the third child order may be transmitted to the second exchange system.

Child orders may have multiple quoting legs that are quoted at multiple exchange systems. As will be discussed below, a series of trading devices 902 may be used to submit the child orders. For example, a first trading device (for example, located in Chicago) may split a trading strategy order (for example, generated by a client device located in Milwaukee) into a first child order and a second child order. The first child order may include a first quoting leg associated with a first tradeable object that is traded at a first exchange (for example, located in Europe) and a second quoting leg associated with a second tradeable object that is traded at a second exchange (for example, located in Japan). The second child order may include a third quoting leg associated with a third tradeable object that is traded at a third exchange (for example, located in Chicago). The first trading device may send the first child order to a second trading device (for example, located in Europe) and the second child order to a server associated with the third exchange for submission. The second trading device may split the first child order into a fourth child order and a fifth child order. The fourth and fifth child orders may be sent to server devices associated with the respective exchanges.

A server device may work with multiple exchanges, such that two or more quoting legs in a child order have quoting orders that are worked at different exchanges. For example, a child order may be associated with a first quoting leg that is worked at a first exchange and a second quoting leg that is worked at a second exchange. A server device may work orders for the first quoting leg and the second quoting leg, even though the orders are being worked at different exchanges.

Referring back to FIG. 6A, in response to determining that the trading strategy order 610 includes leg A and leg B, both of which are marked as quoting legs, the trading device 602 may define a first child trading strategy including leg A and a second child trading strategy including leg B. Then, the trading device 602 may generate a child order 614 for the first child trading strategy and a child order 616 for the second child trading strategy. Accordingly, the child order 614 includes leg A, which is marked as a quoting leg, and the child order 616 includes leg B, which is marked as a quoting leg.

The trading device 602 may intelligently route the multiple child orders 614, 616. For example, a child order can be sent to a server device 601*a* adapted to work the child order with a respective exchange 603*a* adapted to fill the quoting legs in the child orders. In the event that there are multiple server devices 601*a-n* adapted to work a child order, the trading device 602 may send the child order to a server device 601*a* located at a site nearest (e.g., geographically) to the exchange 603*a*. For example, as shown, the child order 614 may be sent to the server device 601*a*, which is located nearest to the exchange 603*a*, and the child order 616 may be sent to the server devices 601*b*, which is located nearest to the exchange 603*b*. This may be based on a geographical location. For example, the server device 601*a* may be 1 mile away from exchange 603*a*, whereas the next closest server device may be more than 1 mile away.

Furthermore, the trading device 602 may select a communication path for sending the child orders based on latency. Latency may include the time required for a receiving device, such as a server device 601*a* or exchange 603*a*, to receive a child order from the trading device 602. The trading device 602 may reduce or minimize latency, for example, by submitting a child order via a communication path that has the least or a reduced amount of delay between the trading device 602 and the exchanges 603*a-n*. The communication path may connect the trading device 602 and the exchanges 603*a-n*. In one example, the communication path may include communication devices, such as communication nodes, routers, servers, etc., that may report delay back to the trading device 602. The trading device 602 may analyze the information to determine the optimum (for example, with the least latency) communication path.

Although FIG. 6A illustrates splitting the trading strategy order 610 with a single trading device 602, a series of (for example, two, three, or more) trading devices may be used for splitting the trading strategy order 610. The series of trading devices may split the trading strategy order at various layers or locations of the trading system 600. Multi-layer, multi-location, or both multi-layer and multi-location splitting may be performed by one or more trading device 602. For example, a first trading strategy device, such as the trading device 602, may split the trading strategy order 610 into a first child order and a second child order. The first child order, including multiple quoting legs, may be transmitted to a second, different trading device for splitting again.

Once a child order is received, the server device 601a may submit an order for one or more quoting legs ("quoting order") to an exchange adapted to match the quoting leg. The one or more quoting legs in the quoting order may be the quoting legs defined in the child orders. For example, as shown in FIG. 6, in response to receiving the first child order 614, the server device 601a may submit a quoting order 618 to the exchange 603a. The quoting order 618 may include the first quoting leg Q1. In response to receiving the second child order 616, the server device 601b may submit quoting order 620 to the exchange 603b. The quoting order 620 may include the second quoting leg Q2.

The exchanges 603a-b may confirm receipt of quoting order 618 and Q2 quoting order 620 by sending an order confirmation 622 and order confirmation 624, respectively. The order confirmations 622, 624 may include confirmation information that allows the server devices 601a-b to work the quoting orders 618, 620, respectively. For example, the confirmation information may include identification information that allows the server device 601a to identify the quoting orders 618, 620 when placing subsequent orders, such as cancels or hedge orders. Without the confirmation information, the server devices 601a-b may be unable to cancel, replace, or cancel or replace one or both of the quoting orders 618, 620.

The server devices 601a-b may be adapted to work the quoting order 618 and the quoting order 620, respectively. As discussed above, working an order may include re-quoting the order, cancelling the order, sending a hedge order, managing an outstanding order, or any combination thereof.

For example, as shown in FIG. 6A, the server device 601b may receive a market update 626 from the exchange 603a. The market update 626 may indicate a change in price of the leg that the quoting order 620 is leaning on. Accordingly, to achieve the target price for the trading strategy, as defined in the trading strategy order 610, the server device 601b may submit a change order. The change order 628 changes the quoting order 620, such that the quoting order 620 has an adjusted price value. The adjusted price value is based on the change in price indicated in the market update and ensures that the target price for the trading strategy, as markets fluctuate, is achieved. The exchange 603b may confirm receipt of the change order 628 by sending a change order confirmation 630 to the server device 601b.

However, prior to the server device 601b receiving the change order confirmation 630, the server device 601b receives another market update 632 from the exchange 603a. The market update 632 is different than the market update 626. For example, the market update 632 indicates yet another price change for tradeable object A. Until the server device 601b receives the change order confirmation 630 for the change order 628, the change order 634, which adjusts the price value for quoting order 620, cannot be sent. However, since the server device 601b is located in, at, or near the exchange 603b the time period 638 that the server device 601b must wait is reduced, for example, because the change order confirmation 630 does not have to be sent all the way back to the server device 601a, as shown in FIG. 6A.

Figure 6B:
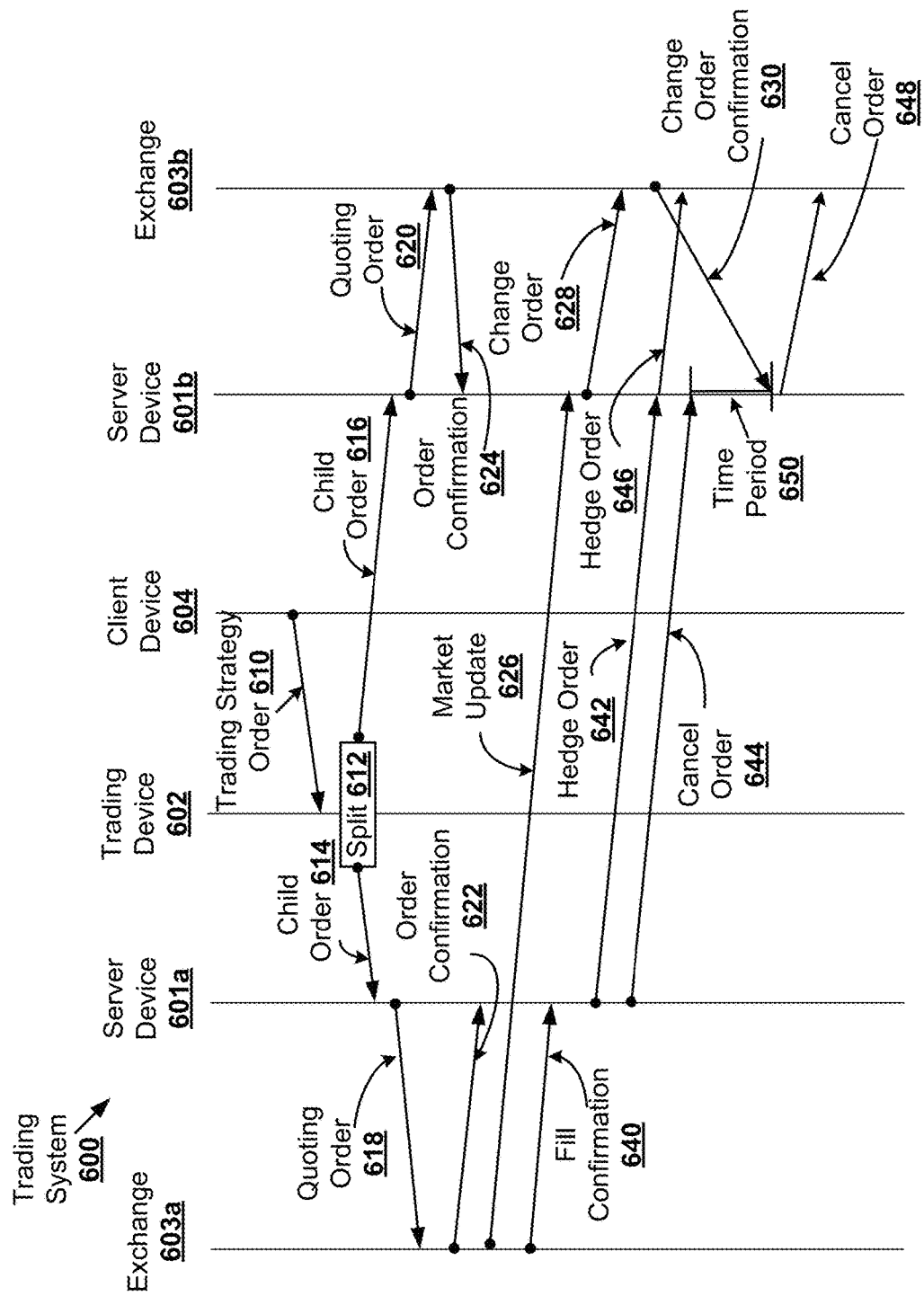

FIG. 6B illustrates a trading system 600 that is used for working a trading strategy order 610. The process of placing the trading strategy order 610 is similar to that shown in FIG. 6A, however, instead of market update 632 being sent to the server device 601b, the exchange 603a matches the quoting order 618 and sends a fill confirmation 640. However, in another example, the quoting order 618 may be matched before or at the same time as the market update 626. In response to filling the quoting order 618, the exchange 603a sends a fill confirmation 640 to the server device 601a, as shown in the example of FIG. 6B, confirming that the quoting order 618 was matched. Alternatively, or additionally, the fill confirmation 640 may be sent to the trading device 602, server device 601a-b, or a combination thereof.

In response to receiving the fill confirmation 640, the server device 601a transmits a hedge order 642 and a cancel order 644 to the server device 601b. The hedge order 642 places a trade order for the leg that leg A was leaning on. The hedge order 642 may be submitted prior to or after the cancel order 644. The cancel order 644 cancels the quoting order 620 for leg B. Although shown in FIG. 6B as separate messages, the hedge order 642 and cancel order 644 may be a single order message.

In some embodiments, for example, when the server side devices 601a, 601b are not in communication with each other, the hedge order 642 and cancel order 644 may be transmitted to the trading device 602 for routing to the server device 601b, for example. Alternatively, or additionally, the server device 601a may transmit the hedge order 642 and cancel order 644 to the server device 601b, for example, when the server devices 601a-b are in communication with each other.

Once the hedge order 642 is received by the server device 601b, the server device 601b sends a hedge order 646 to the exchange 603b. The hedge order may be placed at any time, for example, before the change order confirmation 630 is received, before or after the cancel order 644, after the server device 601b receives the change order confirmation 630, or any other time.

Prior to receiving the change order confirmation 630, the server device 610b receives cancel order 644. However, at the time the cancel order 644 is received, the server device 601 is unable to cancel the change order 628 because the server device 601 has not received the change order confirmation 630 with the confirmation information; and thus, does not know which order to cancel. Accordingly, the server device 601b is unable to perform the cancel operation until the change order confirmation 630 is received. As a result, the trader is open to risk during the time period 650, which includes the time between receiving the cancel order 644 and receiving the change order confirmation 630. However, as discussed below, this time period is much smaller than the instance where the change order confirmation 630 would have to be sent all the way back to the server device 601a before sending the cancel order 648. Once the change order confirmation 630 is received, the server device 601b submits a cancel order 648. The cancel order 648 cancels the change order 628. The hedge order 646 may be submitted during the time period 650 because the confirmation information is not needed.

As shown in FIG. 6B, splitting a trading strategy order and sending child orders to server devices 601a-b at, near, or in one, some, or all of the exchanges 603a-b may reduce the amount of time that a trader is at risk for being legged, double filled, or both legged and double filled. That is, the server device 601b can submit the cancel order 648 as soon as it receives the change (or a Cancel/Replace if Change is not supported) order confirmation from the exchange 603b. Since the server device 601b and exchange 603b are located closer to each other than the server device 601a and the exchange 603b, the waiting time (e.g., the time period 650) for the confirmation 630 is less than the waiting time (e.g., the time period 534) for the confirmation 524. Plus, the distance traveled by the change order confirmation 630 is less than the distance traveled by the change order confirmation 524. Furthermore, the distance traveled by the cancel order 648 is less than the distance traveled by the cancel order 538. With respect to time, a shorter distance may indicate less travel time, and thus, a greater advantage for the user.

Before and after the child orders are submitted to the exchanges, the server devices(s) 601a-b may, for example, cancel orders, change orders, query an exchange, or any combination thereof. Cancelling orders may include cancelling all or some of an order that has been or is scheduled to be submitted to an exchange system. For example, in the event that an exchange 603a is only able to fill a portion of a quoting order, the exchange 603a, instead of waiting until the entire order can be filled, will trade only the portion that is able to be filled and send a partial fill order to the server device 601a. In response, the server device 601a may send a partial cancel order and a partial hedge order. This allows continuous or periodic filling until the entire trading strategy is completely filled.

Furthermore, changing an order may include, for example, changing order parameters, changing the formatting of an order (for example, changing to a protocol, such as the Financial Information Exchange (FIX) protocol), submission time of an order, changing a communication path for submission, or any combination thereof. Querying an exchange may include requesting information, such as market data, or other data.

The child trading strategies are generally functionally the same as the parent trading strategy except for the number of legs marked as quoting legs. Filling either the first child order 614 or the second child order 616 is the same as filling the trading strategy order 610. For example, filling one of the child orders may produce the same or substantially the same result as filling the trading strategy order 610 from a client device 604. The term "substantially" takes into account minor variations in the electronic trading system 600, for example, changes in price that may occur by varying (for example, increasing or decreasing) the time for filling one or more orders. Prices fluctuate quickly. Accordingly, the price for filling the order from the client device 604 may be different than the price for filling a child order, for example, because the child order may be submitted in less time than the order from the client device 604. However, the same trading strategy is executed, even though the price may change, by filling the order from client device 604 or filling a combination of one, some, or all of the child orders 614, 616. It should be noted that having a server that is close to the exchange increases the likelihood of being filled on the quoting leg. Furthermore, the hedge order is more likely to arrive faster to the exchange (compared with a single server side solution). Additionally, there is less likelihood of being double filled since the second quoting order is removed faster (the in-flight time is reduced to a minimum).

In the example of FIG. 6B, the exchange 603a filled the first child order 614 before the exchange 603b was able to fill the second child order 616. However, in other examples, the exchange 603b may be able to fill the second child order 616 before the first child order 614 is filled. Accordingly, the process may be reversed such that the Q1 order 618 is cancelled and replaced.

VII. Example Distributed Server Architecture

Figure 10:
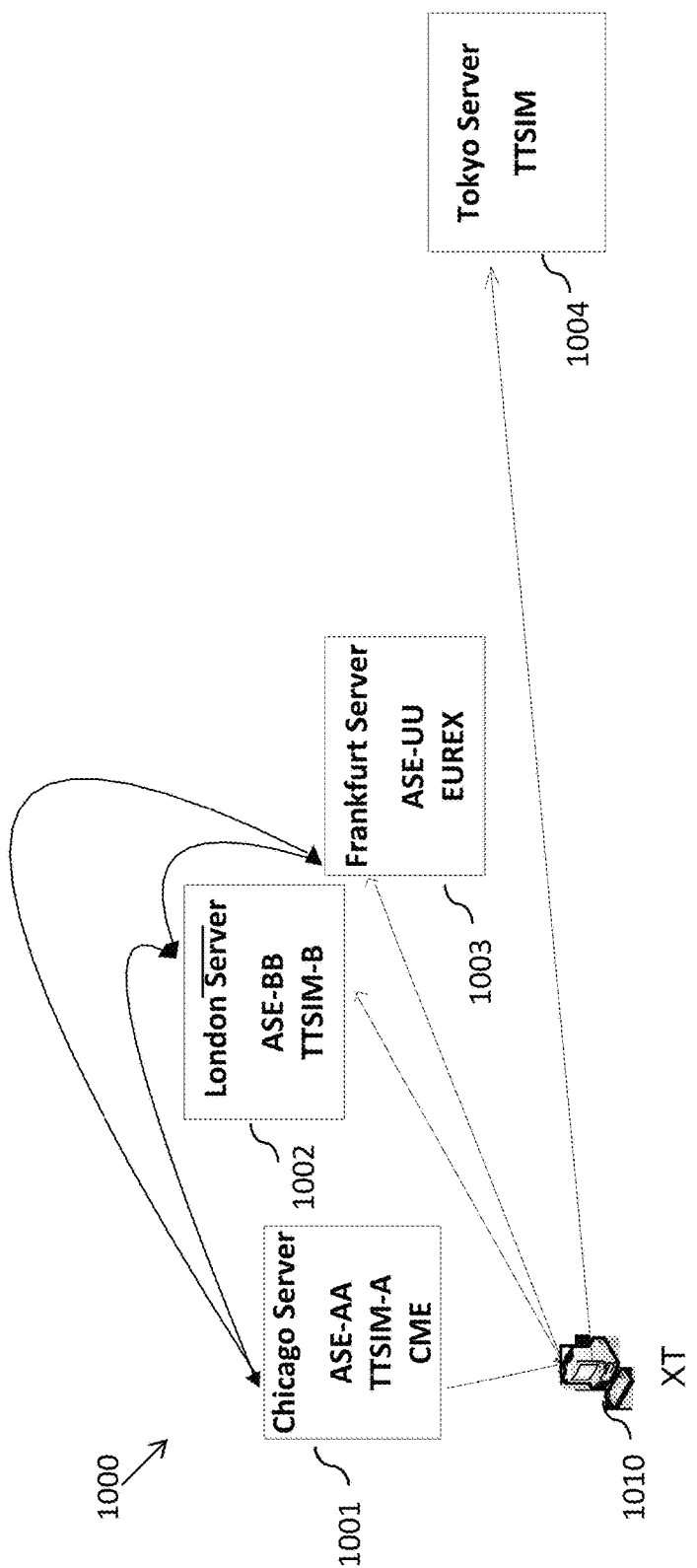
FIG. 10 illustrates an example distributed server architecture.

As described above, a distributed network of servers can be used to communicate orders to a plurality of associated exchanges. As illustrated, for example, in FIG. 10, certain embodiments utilize a plurality of servers 1001-1004 in a distributed server architecture 1000. The distributed server architecture 1000 may be used, for example, to handle orders for a trading strategy for a trading device 1010. The trading strategy may include multiple tradeable objects (e.g., trading a spread), for example. While the following embodiments are described with respect to a spread, certain embodiments may be used for a variety of trading strategies.

1. Launching a Spread on an Example Distributed Server Architecture

In certain embodiments, prior to launching a spread, a trader may configure the spread. A client-based spreader may be used to configure the spread, for example. The spread may be a "real" (e.g., listed at an exchange) spread or a "synthetic" (e.g., not listed at the exchange) spread.

Configuring the spread may include selecting (e.g., automatically and/or by user selection) two or more individual tradeable objects underlying the spread, referred to herein as "legs" of the spread, and establishing the relationship between the legs.

In certain embodiments, a spread may be configured to customize, among other things, calculation of spread price, spread market depth, etc. Calculation of spread price and spread market depth may be based on 1) bids and offers from actual markets for the tradeable objects forming the legs of the spread and 2) spread setting parameters, for example. Spread setting parameters may be provided as default values set by a system and/or software and/or as user-entered values, for example. In certain embodiments, an existing spread may be re-configured (e.g., by a user and/or by a system such as a trading device) and/or a new spread may be created by first selecting underlying tradeable objects (e.g., legs) for the spread. Once the tradeable objects are selected, the spread may be configured based upon spread setting parameters (e.g., via default settings, a user configuration window, etc.).

Based on selected market data feeds and spread setting parameters, an automatic spreader may generate a spread data feed, for example. In certain embodiments, the spread data feed includes spread prices and spread depth. Additionally, the spread data feed may also include a last traded price, a last traded quantity, an open value, a close value, a settlement price, daily high/low values, etc. In certain embodiments, a trader's and/or trading device's settings and/or trader input may customize information included in the spread data feed.

The spread data feed may be updated (e.g., continuously or periodically) and stored according to received market data feeds. Therefore, in certain embodiments, generation of a spread data feed may continue on a real time (or substantially real time accounting for a data transmission, processing, and/or storage delay) basis as information is relayed from the market. In certain embodiments, generation of the spread data feed may be configured for periodic update. In certain embodiments, only values displayed in a spread window that change from one generation of the spread data feed to the next are updated on the spread window display.

Once the underlying legs for the spread have been selected, the servers that are to manage the orders for the legs of the spread may be selected. In prior systems, a single server managed all of the legs for a spread and, therefore, no particular servers were selected. By distributing each of the legs to different servers, however, intelligently selecting the servers to work the various legs may provide certain advantages (e.g., time savings, load balancing, etc.).

Figure 11:
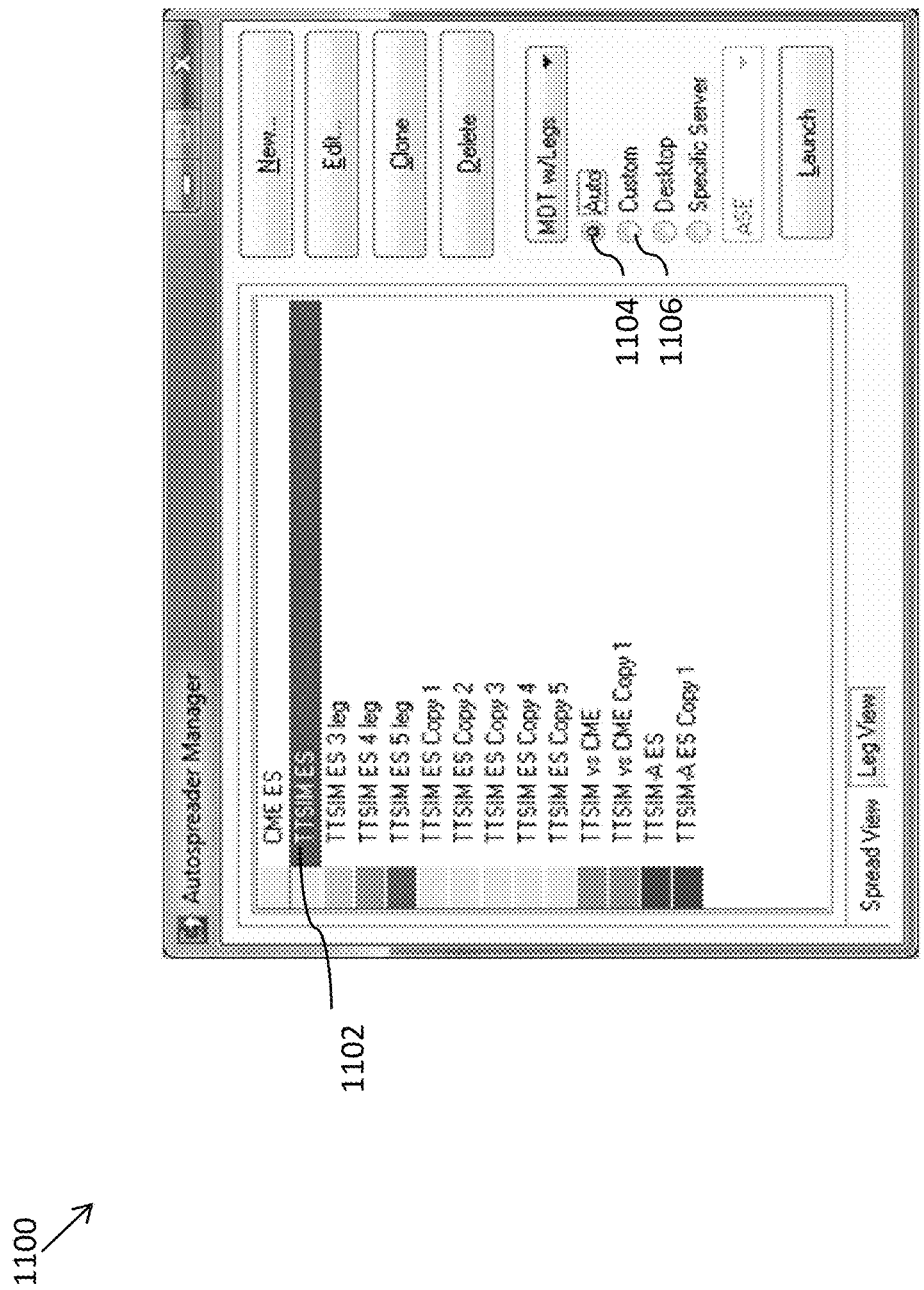
FIG. 11 illustrates an example spread management interface.

In an embodiment, a user and/or program may select whether the servers are manually or automatically selected once the spread is launched. The user selection may take place when configuring the spread, for example. As shown in an example spread management interface 1100 of FIG. 11, a user may select "Auto" 1104 (e.g., an automatic selection mode) or "Custom" 1106 (e.g., a custom selection mode) when configuring a selected spread or spread leg 1102 (e.g., when selecting the different contracts that the user may utilize when spread trading). A detailed description of each mode is described further below.

a. Custom (e.g., "Manual") Selection

Figure 12:
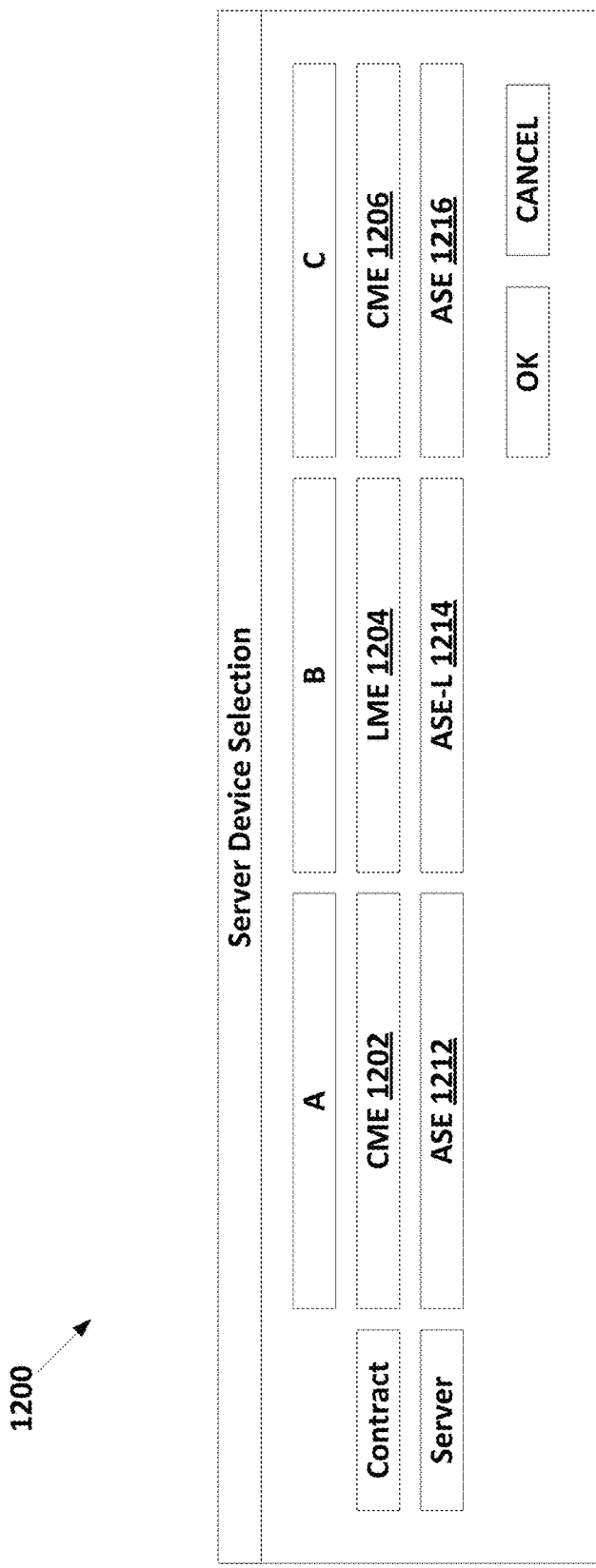
FIG. 12 shows an example server selection interface for spread trading.

When the custom mode is selected, the user may manually select the server that is responsible for working each of the legs. For example, as shown in an example custom selection interface 1200 of FIG. 12, the user may decide to trade a three-legged spread. The contract for Leg 1 1202 is CME ES Dec08. The contract for Leg 2 1204 is LME ES Jan09). The contract for Leg 3 1206 is CME ES Jan10. A drop-down menu 1212, 1214, 1216 allows a user to select which server will manage a particular leg. For example, as shown in FIG. 12, the user may select a first server 1212, such as "ASE," which is located in Chicago, to work Leg 1. Leg 2 is worked by a second server 1214, such as "ASE-L," which is located in London. Finally, the user may select the first server 1216, such as "ASE," to work Leg 3.

b. Automatic Selection

When the automatic mode is selected, the various servers that are responsible for working the legs in the spread are automatically selected based on, for example, server location, server performance, network performance, or a combination thereof. The trading device or a server device may automatically select the various servers.

One or more criterion such as speed, proximity to an exchange, communication latency, etc., may be considered to prioritize one available server over another available server. In an embodiment, a server may be automatically selected to work a leg order (e.g., an order for a leg of the spread) based on the physical location of the server, for example, relative to the physical location of an exchange or the trading device. For example, if a tradeable object is traded on a particular exchange, then a server that is located near that particular exchange may be selected.

In another embodiment, a server may be automatically selected to work a leg order based on the performance of a server, for example, relative to the performance of another server. For example, servers ASE-1, ASE-2, and ASE-3 may be located in Chicago. However, these servers may be operating differently and/or have different resources available. By way of illustration, server ASE-1 may be operating at 97% of capacity; server ASE-2 may be operating at 95% of capacity; and server ASE-3 may be operating at 10% of capacity. It may be beneficial to select ASE-3 as the server that works the particular leg, even though ASE-3 may be located further away from the exchange (e.g., matching engine) than ASE-1 and ASE-2 (e.g., rack position).

In another embodiment, network latency may result in a particular server being chosen (similar to performance discussed above). The latency may be measured between the trading device, server, gateway, exchange, or a combination thereof.

2. Control (e.g., "Master") Server

Within an electronic trading system, the gateways are configured to communicate with and send messages to each of the servers. The messages may be real order messages and synthetic order messages. Real order messages are messages that relate to orders for real tradeable objects. Synthetic order messages relate to orders for synthetic tradeable objects. Synthetic order messages may include messages including data about all or a portion of an order for a synthetic spread (e.g., status, fill, etc.).

Traditionally, each (e.g., all) of the servers were configured to report back synthetic order messages to the trading device. Since the gateways communicate with each of the servers, in a traditional system each of the servers would be configured to report back all the synthetic messages. However, reporting from each of the servers floods the trading device with redundant synthetic messages because the trading device receives the same synthetic order messages from different servers (while ASE is used throughout the examples provided herein, it will be understood that an ASE may refer to the Autospreader™ Strategy Engine as well as other trading strategy engines or TSEs).

Figure 13:
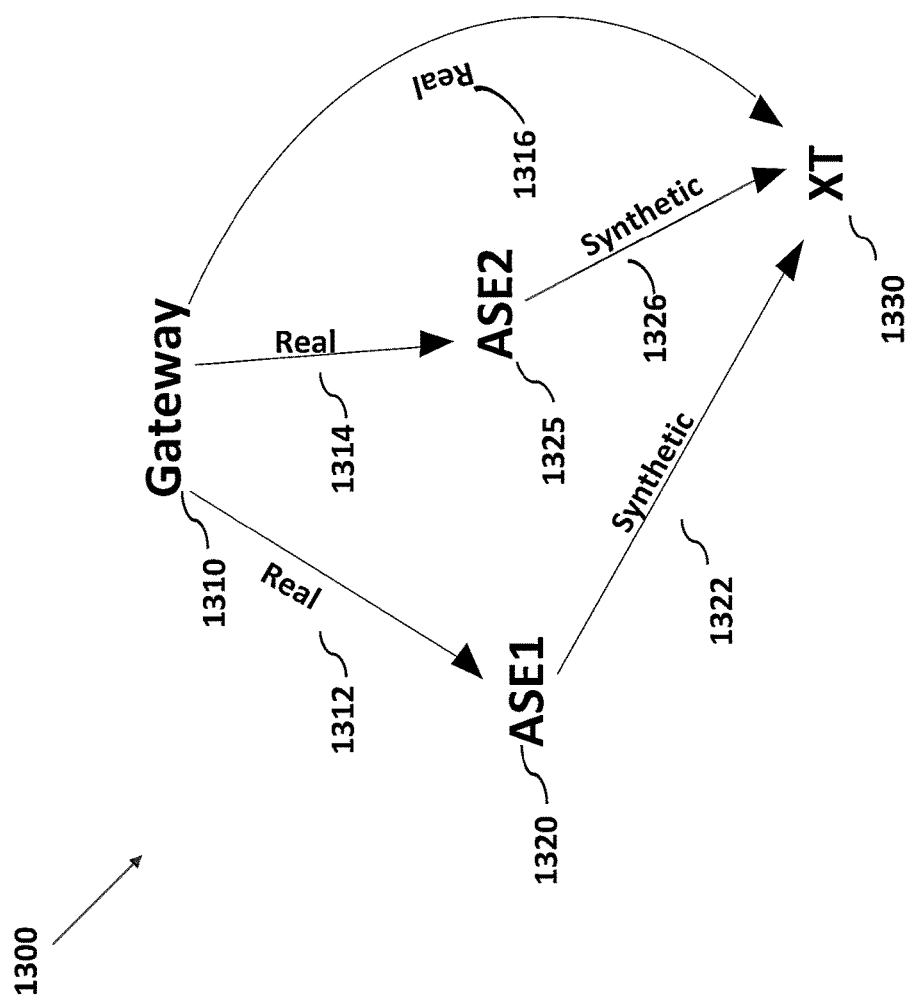
FIG. 13 illustrates an example electronic trading system.

For example, as shown in FIG. 13, a gateway 1310 transmits real messages (e.g., a fill) 1312, 1314, 1316 to each of servers (ASE1 and ASE2) 1320, 1325 and a trading device (e.g., X-Trader™ or XT) 1330. The servers 1320, 1325 then transmit synthetic order messages to the trading device 1330. The trading device 1330 receives redundant synthetic order messages 1322, 1326.

Figure 14:
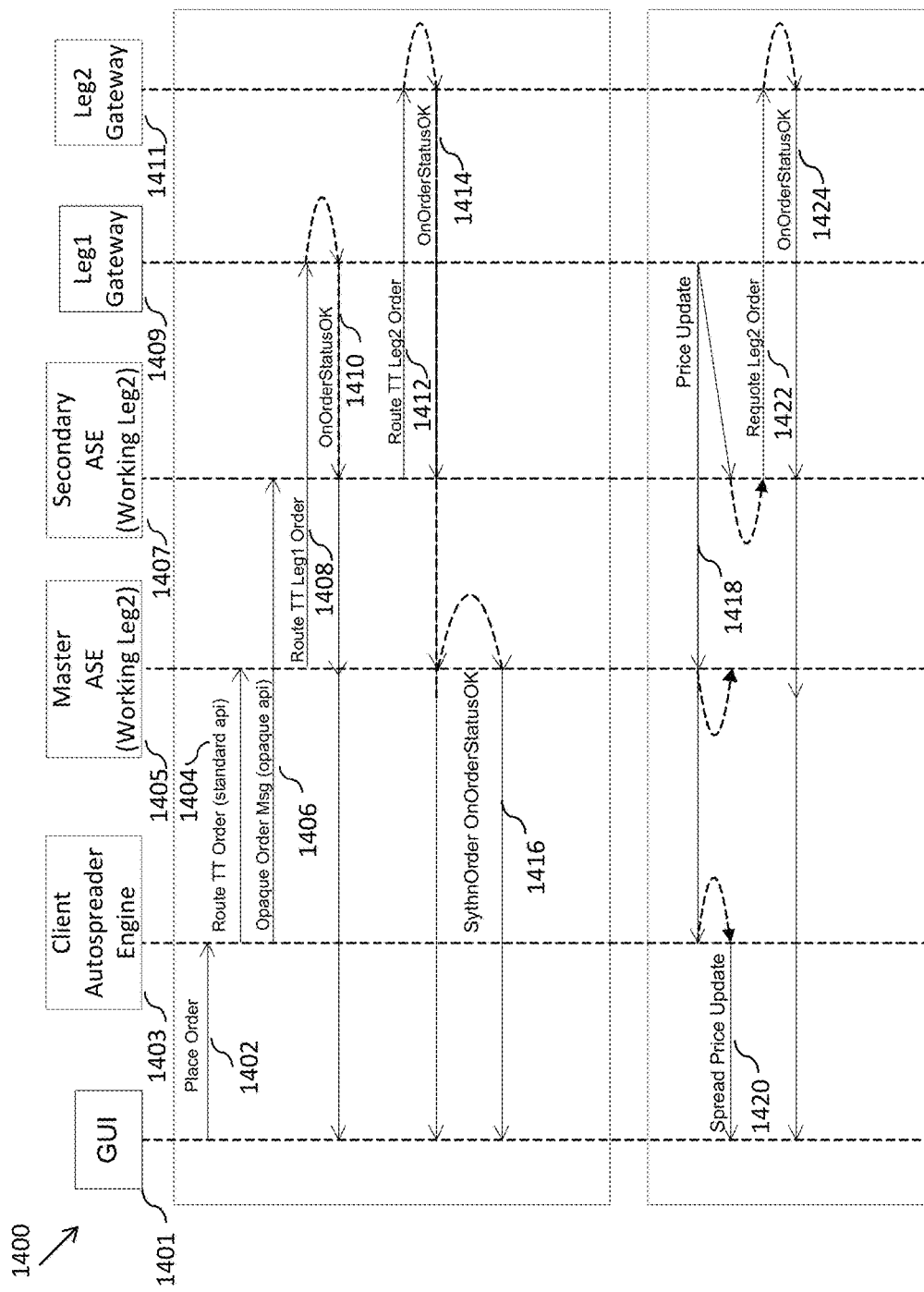
FIG. 14 shows an example data flow of an electronic trading system to facilitate trading of legs of a spread.

In another example, as shown in a data flow 1400 of FIG. 14, a server may be designated as a "master" or control server, with additional servers operating as secondary servers based on instruction from the master. As shown in the example of FIG. 14, a place order message 1402 is placed from a trading device interface (e.g., a graphical user interface or GUI) 1401 to a client engine (e.g., a client Autospreader™ engine) 1403. The engine 1403 routes the order 1404 to a first or master trading engine 1405 to work a first leg of the order 1404. Additionally, an order message 1406 (e.g., an open protocol for accessing question engines (OPAQUE) message) is sent to a second or secondary trading engine 1407 to work a second leg order 1406.

In an embodiment, the servers may not communicate with each other regarding trading strategies (e.g., they may communicate heart beats and other non-strategy messages). The trading device 1330 may communicate strategy related messages.

The master trading engine 1405 sends the leg one order in a message 1408 to a first leg gateway 1409. The leg one gateway 1409 sends an "OrderStatusOk" message 1410 back to the master trading engine 1405, the secondary engine 1407, and the trading device (e.g., GUI) 1401 when the leg one order is confirmed at the leg one gateway 1409.

Figure 15:
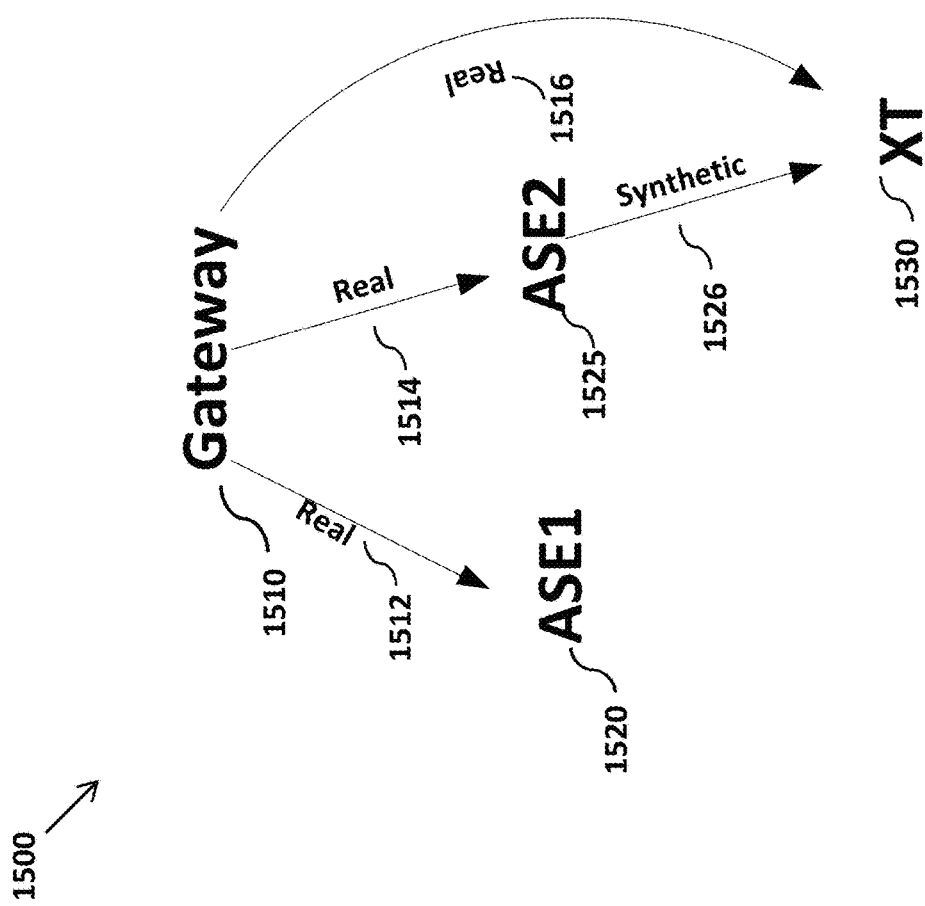
FIG. 15 illustrates an example electronic trading system including a control server and at least one additional server.

In an embodiment, a server is designated as a control (e.g., master) server. Only the control server is configured to report back synthetic messages to a trading device. The other servers are configured to refrain from reporting back synthetic messages to the trading device. For example, as shown in FIG. 15, a server ASE2 1525 may be the control server. ASE2 1525 may report back synthetic messages (e.g., synthetic spread fill message) 1526 to a trading device 1530. ASE1 1520 does not report back synthetic messages.

Thus, in the example of FIG. 15, a gateway 1510 transmits real messages (e.g., a fill) 1512, 1514, 1516 to each of servers (ASE1 and ASE2) 1520, 1525 and the trading device (e.g., X-Trader™ or XT) 1530. The server ASE2 1525 then transmits synthetic order messages 1526 to the trading device 1530.

A server may be designated as a control server based on one or more of the following: location, the legs in a synthetic spread, network traffic, user input (e.g., a recommendation), or some other parameter, for example. Designating a server as a control server in a distributed server architecture helps to reduce redundant updates or messages, for example.

For example, in an embodiment, a control server may be selected based on which server is specified for the first spread leg. The server that is responsible for managing the first leg may be the control server. However, in another embodiment, location is used to determine which server is the control server. For example, the server closest to the trading device may be specified as the control server. In another example, the server that is closest to all of the other servers working legs for the spread (e.g., most central) may be specified as the control server. In certain embodiments, a user may select which server is the control server.

Generally, the server designated as the control server is a server that is responsible for working at least one leg in spread. However, this does not have to be the case. The server may be a centrally located server that is not quoting any of the legs in the spread, for example.

In certain embodiments, the control server receives spread order update(s) from one or more of the gateways and reports the update(s) to the trading device. The control server may be responsible for creating and populating logs. The trading strategy engine may write various information log files, for example. In the event of a customer issue, information in the log files may be used to backtrack and determine what happened and why it happened (e.g., software bug, bad luck, random occurrence, etc.). For example, the control server may output information about the synthetic fills. The output information is a listing of all the fills that go into a particular synthetic spread fill (e.g., fill identifier, quantity, price, etc.). The control server may review or facilitate review of the synthetic fill to review the determination of synthetic fill quantity, price, etc.

3. Hedge Management

Figure 16:
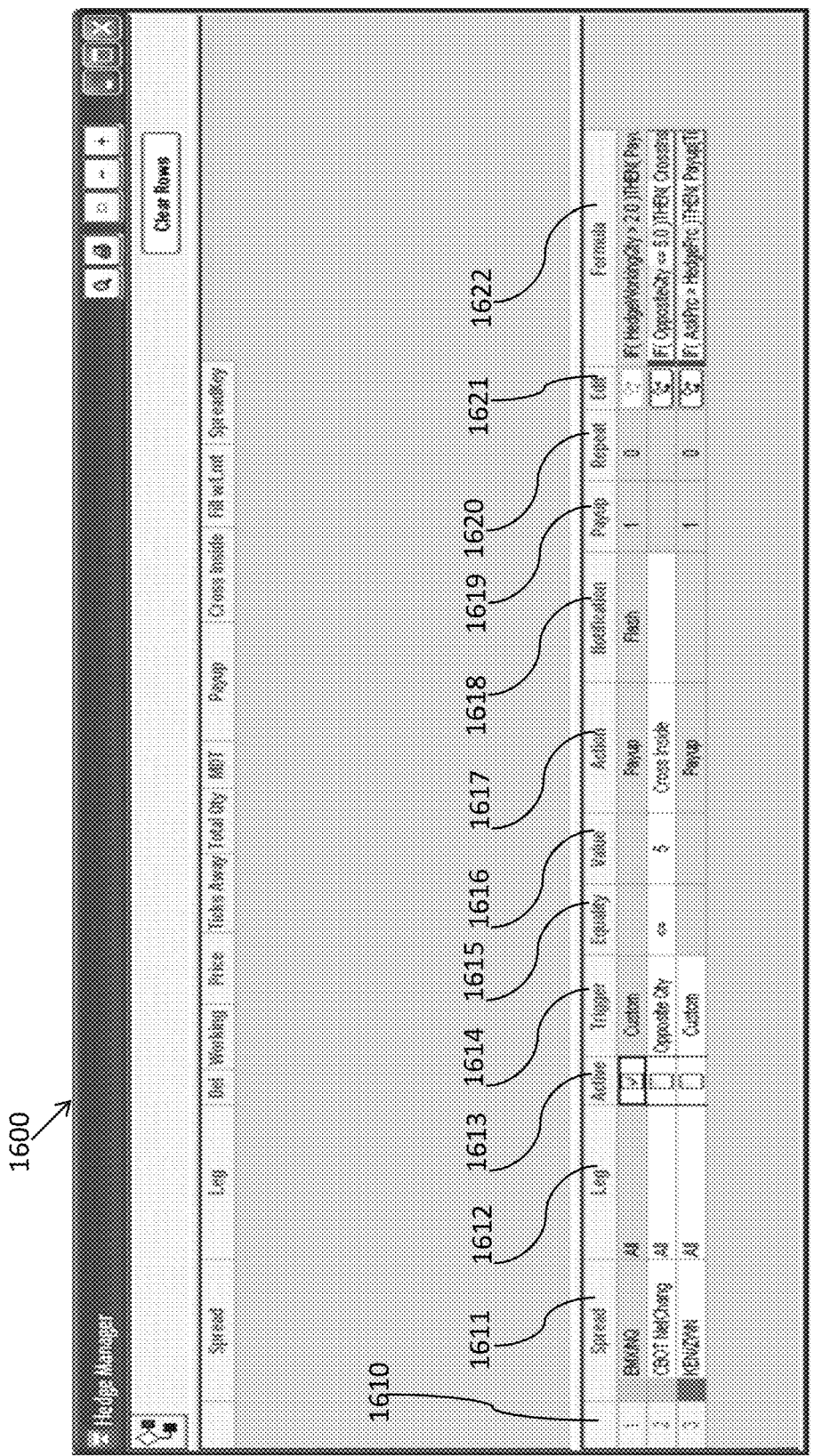
FIG. 16 depicts an example hedge manager interface for a trading device.

In an embodiment, one or more hedge management rules are integrated with the trading strategy engine, such as an Autospreader™ Engine (e.g., on a trading device). Hedge management rules run on a trading server, for example. Hedge management rules are rules that depict how one or more orders will be hedged. For example, a hedge management rule may include "if leg 1 is filled above X, then sell leg 2 at the inside market." Hedge management rules are created by or at the trading device via a desktop Hedge Manager graphical user interface (GUI) 1600, for example, as shown in FIG. 16.

For example, as shown in the interface 1600, a rule 1610 may include one or more fields such as a spread 1611, one or more applicable legs 1612, an activation option 1613, a trigger definition 1614, an equality 1615, a value 1616, an action to be taken 1617, a notification option 1618, a payup value 1619, a repeat value 1620, an edit flag 1621, a formula 1622, etc. Via the interface 1600, a trader may configure, create, and/or manage one or more hedge management rules, for example.

Via the interface 1600, a trading device may be used to activate and deactivate one or more hedge management rules 1610. Activating a hedge management rule 1610 (e.g., by selecting the active option 1613 via the interface 1600) may include enabling the rule on one or more designated trading server(s). In certain embodiments, a server handling a leg of a spread may manage hedge rules with respect to hedge orders that are to be executed for the leg which the server is managing. Thus, hedge management may be performed on the server closest to an exchange for that leg, for example.

Hedge management rules that are activated are sent to one or more designated trade servers, for example. When a hedge management rule is activated and sent to a designated trade server, the working hedge order is managed by the server, and the server is to execute all order manipulations based on defined hedge management rule(s) residing on that server. When a hedge management rule is deactivated, the rule is to be deactivated from the designated trading server from which the spread is launched, for example.

Hedge orders are sent to a gateway by the server whose quoting order received a fill. The server(s) managing the spread receive the fill, but only the engine that is managing the leg that was filled will send the hedge. The gateways send the add notification of the hedge order to the server(s) via a shared order book business, for example. A control server sees the quoting fill and updates a synthetic order status internally. The control server then sends a synthetic order update message (e.g., the order is now either partial or legged) to the one or more clients.

Once the hedge order is in the market, the hedge order may be managed by a different server than the server that placed the order such that the closest server to the exchange is to manage the hedge order. In the example of LME and CME, if the CME quoting order is filled, the Chicago ASE will send the LME hedge. If the hedge is legged, the LME ASE will execute the hedge rules in the hedge order.

Figure 17:
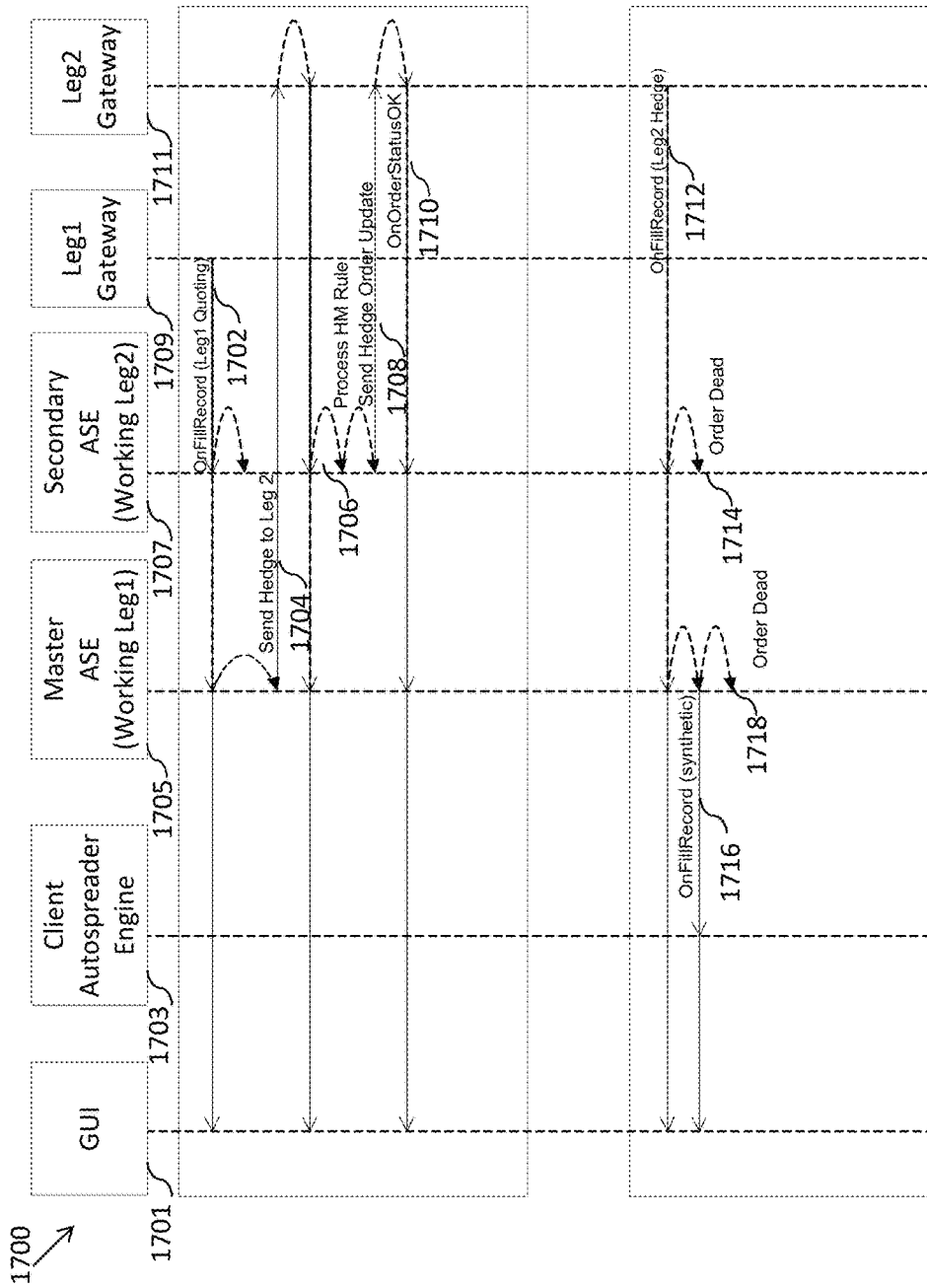
FIG. 17 provides a diagram of an example data flow for a fill and hedge sequence.

FIG. 17 provides a diagram of an example data flow 1700 for a fill and hedge sequence. In the example of FIG. 17, a gateway 1709 handling a first leg (e.g., a quoting leg) of a spread sends a fill message to a secondary trading engine 1707 handling a second leg of the spread as well as a first trading engine 1705 handling the first leg and a user interface 1701 for display.

In the example of FIG. 17, the trading engine 1705 serves as a master trading engine 1705. The master trading engine 1705 sends a hedge order 1704 for the second leg of the spread to a leg two gateway 1711. The secondary trading engine 1707 processes a hedge management rule 1706 and sends a hedge order update 1708 to the leg two gateway 1711. Once the updated order has been processed, the leg two gateway 1711 sends an order status ok (e.g., "OnOrderStatusOk") message to the secondary trading engine 1707, the master trading engine 1705, and the interface 1701.

Additionally, the leg two gateway 1711 sends a message 1712 to the secondary trading engine 1707, the master trading engine 1705, and the interface 1701 upon a fill of the second leg hedge order. The secondary trading engine 1707 kills or ends the order 1714. The master trading engine 1705 provides a fill record message for synthetic orders to a client trading engine (e.g., an Autospreader™ engine) and the user interface 1701. The master trading engine 1705 also kills or ends the order 1718.

Figure 18:
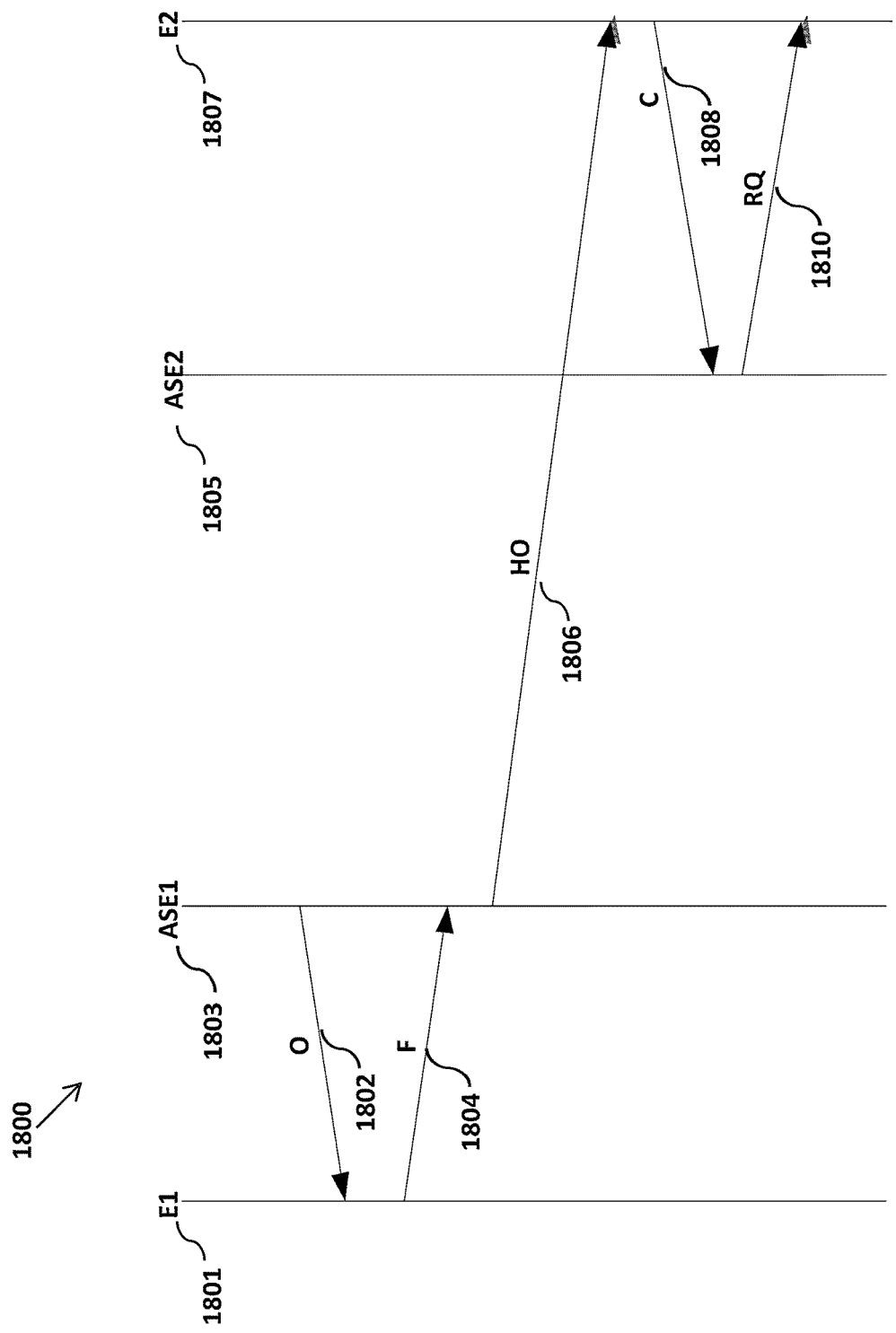
FIG. 18 illustrates an example data flow diagram for hedge management.

FIG. 18 illustrates an example data flow diagram 1800 for hedge management in a distributed system. As shown by way of illustration in FIG. 18, server ASE1 1803 submits a trade order O 1802 to exchange E1 1801. Exchange E1 1801 sends a fill message F 1804 to ASE1 1803 when the trade order O is filled. ASE1 1803 then places a hedge order HO 1806 directly with exchange E2 1807, instead of sending a message to server ASE2 1805. The hedge order is placed based on the hedge management rules. However, ASE2 1805 receives a confirmation message C 1808 from the exchange E2 1807 and is responsible for managing the hedge order HO based on the hedge management rules. For example, ASE2 1805 may requote RQ 1810 the hedge order as market conditions change.

In certain embodiments, if connecting to an ASE server that does not incorporate the Hedge Manager rules, for example, an older version of ASE, the rules run locally on the trading device. As a result, the trading device may manage the hedge management rules.

If a connection to an ASE server is inactive or impaired and hedge rules are active on that server, hedge order(s) are no longer managed by that server. The hedge orders continue to work in the market, but rules do not get applied to the order. However, in some instances, other servers or client devices can detect the outage and start managing the hedge order. Once the ASE is available or accessible, hedge orders continue to not be managed by a rule on the server, and the user is to manage his or her own hedge orders.

If connection to an ASE server is inactive or impaired and hedge rules are active on that server, a message is logged in the Audit Trail indicating that the hedge order is no longer managed on the server. For example, an Audit Trail message may include: "ASE is down. Hedge orders will continue to work in the market but are not managed by a rule on ASE."

4. Dynamic Switching of Servers During a Trading Session

In certain embodiments, the trading device or a server device may dynamically designate which server is the control server (for example, while a synthetic spread is being worked at the various exchanges).

Failover processing is updated to monitor all the servers for a spread. If connection with any of the servers goes down, the spread order is pulled from the market. However, in certain embodiments, instead of pulling the spread order, other servers can begin managing the spread order or just delete the quoting order. Determining whether a server goes down may be determined in a variety of ways (using heart beats, for example).

For example, when a server is up (e.g., available and accessible), the server broadcasts a "heartbeat" message so other machines may see that the server is there and running. A heartbeat message, for example, is a simple message that is sent on a timer or interval, for example, every ten seconds. Because the message is a message repeating at an interval (e.g., a constant interval) telling other applications or devices that the server is running, the message is called a heartbeat—the message indicates the process and/or server is alive. If the heartbeats keep coming at the appropriate interval, the heartbeats indicate that the server is operational. If one or two heartbeats are missed, for example, the omission may not be a cause for worry about because the omission may be a result of a glitch or dropped packet. However, if several heartbeats in a row are lost, then clients may be alerted that the server is down. In this event, hedge management fails over to the next closest server or other server satisfying one or more failover criterion (e.g., communication distance, communication latency, performance, workload, etc.).

Figure 19:
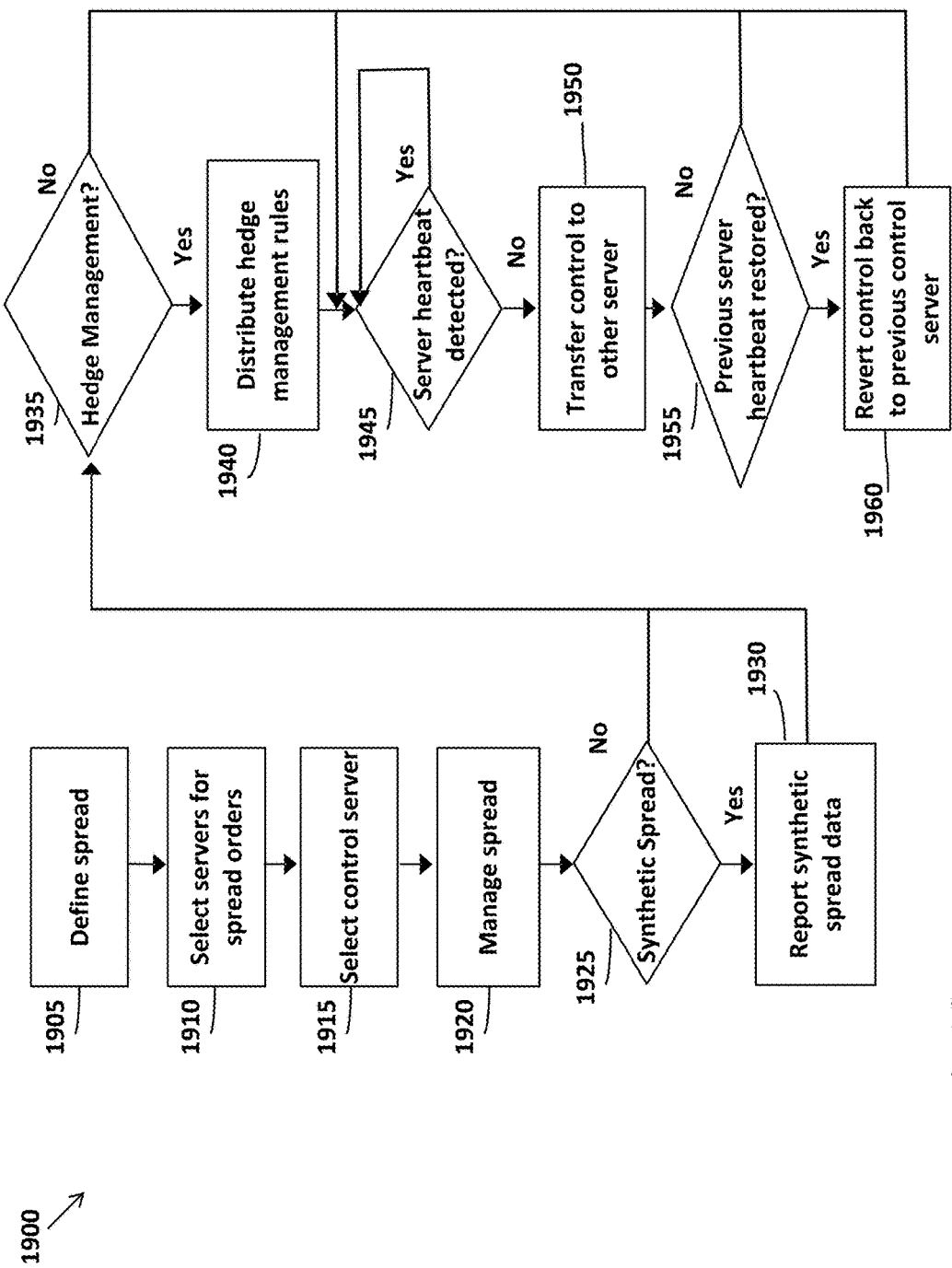
FIG. 19 illustrates a flow diagram for an example method for server allocation and spread management.

FIG. 19 illustrates a flow diagram for an example method 1900 for server allocation and spread management. At block 1905, a spread is defined. For example, a spread may include two or more tradeable objects, referred to as legs. For example, market information such as market data feeds, may be received from one or more exchanges at a trading device. A market data feed generally includes the price, order, and fill information for an individual tradeable object, for example. In an embodiment, the market data feed provides the highest bid price (HBP) and the lowest ask price (LAP) for a tradeable object, referred to as the "inside market," in addition to the current bid and ask prices and quantities in the market, referred to as "market depth." Some exchanges provide an infinite market depth, while others provide no market depth or only a few prices away from the inside market. The number of market data feeds received may depend on the number of tradeable objects selected for spread trading by a user, or alternatively, some or all of the data feeds from an exchange are received and only those tradeable objects which are part of the spread are traded.

In response to an automatic and/or user selection, an automatic spreader, for example, generates a spread data feed based on information in the legs and based on spread setting parameters, which are configurable by a user. The automatic spreader may automatically work the legs to achieve (or attempt to achieve) the spread. In certain embodiments, a program, system, and/or user may re-configure existing spreads, create new spreads, etc.

In certain embodiments, calculation of spread prices and spread market depth may be configured, such as based on bids and offers from the actual markets for the tradeable objects of the legs and the spread setting parameters, which are set by defaults, by the user, etc. A spread data feed is generated based on selected market data feeds, and the spread setting parameters may include spread prices and spread depth, for example. Additionally, the spread data feed may also include the last traded price (LTP) and the last traded quantity (LTQ), in addition to other useful items of interest such as open, close, settlement, daily high/low, and so on.

The spread data feed may be continuously (or periodically) updated and stored at the electronic terminal according to the received market data feeds. Therefore, the process of generating a spread data feed may continue on a real time basis as such information is relayed from the market. However, the generating of the spread data feed may continue on a periodic time basis, for example, every half-second, if programmed.

At block 1910, one or more servers are selected to accommodate the defined spread. The one or more servers may be manually and/or automatically selected based on one or more criterion (e.g., location, latency, performance, workload, processing power, etc.), for example.

At block 1915, a control server is selected among the one or more servers selected to manage the spread. The control server may be selected based on one or more criterion such as location (e.g., relative to a trading device, relative to other servers, relative to an exchange, etc.), an order of legs (e.g., an order of legs in a synthetic spread), network traffic, server performance/workload, user preference, etc.

At block 1920, the designated control server manages the spread and sends commands to place orders for the one or more legs spread. For example, an automated spreader may interact with the control server (and other managed server(s)) to enter and fill orders for the quoting leg and/or the leaning leg based on the spread selected by the user. In certain embodiments, additional opportunities are identified. For example, one or more market data feeds may be monitored and analyzed to determine one or more adjacent positions for conversion or switching of a leg of the currently selected spread.

At block 1925, the spread is evaluated to identify synthetic spread data. If the spread is a synthetic spread, then at block 1930, the control server reports back to a trading device regarding any synthetic spread data that may be a part of the spread being traded. In certain embodiments, non-control servers do not report back to the trading device; only the control server reports back to the trading device.

At block 1935, hedge management rules are identified. If hedge management rules are identified, then at block 1940, one or more hedge management rules are distributed to one or more servers handling the order. For example, hedge management rules may be distributed to the designated control server for coordination with the other servers and spread. Alternatively, hedge management rules may be distributed to all servers handling orders relating to the spread trading. Then, hedge management is conducted based on distributed hedge management rules.

At block 1945, a designated control server is monitored to ensure proper operation. For example, the control server is monitored to detect heartbeat messages received from the server. After a certain amount of time without detecting heartbeat messages and/or other status information, the spread control server may be determined to have failed or become unavailable. Upon a determination of a failure or inability other inability to access a full-service, at block 1950, control of the spread may be transferred to another available service. Thus, reliable and rapid execution of spread orders may be facilitated even in the event of a failure of one or more of the servers used to manage (e.g., trade) the spread.

In certain embodiments, at block 1955, once the original control server is again responsive, at block 1960, control of managing the spread may be returned to the original control server.

Thus, certain embodiments provide systems and methods for selection of servers in a distributed server architecture. Certain embodiments provide for manual selection of servers in a distributed server architecture. Certain embodiments provide automatic selection of servers in a distributed architecture based on one or more criterion. For example, criteria may include physical location of servers. The physical location may be relative to a variety of locations. For example, server location may be evaluated relative to one or more things. Server location may be evaluated relative to a managing server, for example. Server location may be evaluated relative to a client or trading device. In certain embodiments, selection of servers maybe automated based on server performance. For example, payload capacity of one or more servers may be compared to determine selection of one or more servers fax to lengthen the spread. Another criteria may include latency, for example. For example, latency may include a latency between servers (e.g., between a managing server and a secondary server). Latency may also include a latency between a server and in exchange, for example. In certain embodiments, an interface may be provided that allows a user to select between manual and automatic selection of one or more servers in a distributed architecture for spread trading.

Certain embodiments provide a control or master server that may be selected from a plurality of available servers. Selection of a controlled server may be based on a variety of criteria. Example criteria may include a location of the server (e.g., relative to trading device, relative to other server(s), etc.), network traffic, user input, etc. Server location may be evaluated relative to a trading device, relative to other servers, etc. In certain embodiments, user input may be provided as a user recommendation to be factored into automatic selection of one or more servers. In certain embodiments, a control server reports back regarding synthetic spread data to a client or trading device. Non-control servers, for example, may not report back synthetic spread data. Certain embodiments provide a control server to manage a spread. For example, the control server sends commands to various servers and/or exchanges to place order.

Certain embodiments provide for hedge management with respect to a spread. For example, hedge management rules may be distributed to each server facilitating a spread trade. In certain embodiments, hedge management rules may be used to manage a working order that was placed by a different server. Thus, for example, the new server may re-quote, cancel and replace, or cancel an order.

Certain embodiments provide a dynamic switching of spread control from one server to another server. For example, a failure of connection to a first server may be detected such as via a detection or lack of detection of heartbeat message. On detecting this failure of connection, control may be transferred from a nonresponsive server to a secondary server to manage the spread. This condition may be called a failover, for example. In certain embodiments, upon reconnection of the failed server, control of managing the spread may be transferred back to the original server.

Some of the described figures depict example block diagrams, systems and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, or any combination thereof, for example.

The example block diagrams, systems, and/or flow diagrams may be implemented using any combination(s) of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks and/or other functionality may be changed, and/or some of the components, elements, blocks and/or other functionality described may be changed, eliminated, sub-divided, or combined. Additionally, any or all of the components, elements, blocks, and/or other functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:
receiving, by a computing device, a trading strategy order, wherein the trading strategy order includes a plurality of legs, wherein a first leg is associated with a first tradeable object and a second leg is associated with a second tradeable object, wherein the trading strategy is to be executed by a plurality of server side devices in a distributed server system;

selecting, by the computing device, a first server side device of the plurality of server side devices to process one or more trade orders for the first tradeable object associated with the first leg of the trading strategy order and a second server side device of the plurality of server side devices to process one or more trade orders for the second tradeable object associated with the second leg of the trading strategy order such that processing the plurality of legs is distributed among the plurality of server side devices in the distributed server system, wherein the selection of the first server side device is based on a location of the first server side device relative to a first electronic exchange at which the first tradeable object is traded, and wherein the selection of the second server side device is based on a location of the second server side device relative to a second electronic exchange at which the second tradeable object is traded, wherein each of the first server side device and the second server side device are configured to communicate with a trading device and at least one of the first electronic exchange and the second electronic exchange over a computer network, wherein the trading device is configured to process synthetic trade order messages received from at least one of the first server side device and the second server side device; and selecting, by the computing device, either the first server side device or the second server side device as a control server based on a location of the selected server side device in the distributed server system, wherein the first server side device and the second server side device are configured to receive synthetic trade order data related to the trading strategy order from the one or more electronic exchanges over the computer network, and wherein the first server side device or the second server side device selected as the control server is configured to report the synthetic trade order data for the trading strategy to the trading device configured to process the synthetic trade order data, wherein a non-selected server side device of the first server side device and the second server side device is configured to refrain from sending the received synthetic trade order data to the trading device such that the trading device does not receive a redundant message related to the synthetic trade order data from the first server side device or the second server side device that was not selected as the control server; and notifying, by the computing device, the first server side device or the second server side device of the selection as the control server.

2. The method of claim 1, wherein the first electronic exchange and the second electronic exchange are the same electronic exchange.

3. The method of claim 1, wherein selecting the first server side device and the second server side device to process the one or more trade orders for the first tradeable object and the second tradeable object includes automatically selecting the first and second server side devices.

4. The method of claim 3, wherein selecting the first server side device and the second server side device to process the one or more trade orders for the first tradeable object and the second tradeable object includes automatically selecting the first server side device and the second server side device based on a performance parameter of the first server side device and a performance parameter of the second server side device.

5. The method of claim 1, wherein selecting the first server side device and the second server side device to process the one or more trade orders for the first tradeable object and the second tradeable object includes receiving a selection command that defines the first and second server side devices.

6. A system including:
a computing device to facilitate a trading strategy order, wherein the trading strategy order includes a plurality of legs, wherein a first leg is associated with a first tradeable object and a second leg is associated with a second tradeable object, wherein the trading strategy is to be executed by a plurality of server side devices in a distributed server system, wherein the computing device is configured to select a first server side device of the plurality of server side devices to process one or more trade orders for the first tradeable object associated with the first leg of the trading strategy and a second server side device of the plurality of server side devices to process one or more trade orders for the second tradeable object associated with the second leg of the trading strategy order such that processing the plurality of legs is distributed among the plurality of server side devices in the distributed server system, wherein the selection of the first server side device is based on a location of the first server side device relative to a first electronic exchange at which the first tradeable object is traded, and wherein the selection of the second server side device is based on a location of the second server side device relative to a second electronic exchange at which the second tradeable object is traded, wherein each of the first server side device and the second server side device are configured to communicate with a trading device and at least one of the first electronic exchange and the second electronic exchange over a computer network, wherein the trading device is configured to process synthetic trade order messages received from at least one of the first server side device and the second server side device, wherein the computing device is configured to select either the first server side device or the second server side device as a control server based on a location of the selected server side device in the distributed server system, wherein the first server side device and the second server side device are configured to receive synthetic trade order data related to the trading strategy order from the one or more electronic exchanges over the computer network, and wherein one of the first server side device and the second server side device selected as the control server is configured to report the synthetic trade order data for the trading strategy to the trading device configured to process the synthetic trade order data, wherein a non-selected server side device of the first server side device and the second server side device is configured to refrain from sending the received synthetic trade order data to the trading device such that the trading device does not receive a redundant message related to the synthetic trade order data from the first server side device or the second server side device that was not selected as the control server, wherein the computing device is to notify the first server side device or the second server side device of the selection as the control server.

7. The system of claim 6, wherein the trading device comprises an automated trading engine client to facilitate the one or more trade orders with respect to the first server side device and the second server side device.

8. The system of claim 6, wherein the computing device is to automatically select the first and second server side devices to process the one or more trade orders for the first tradeable object and the second tradeable object.

9. The system of claim 8, wherein the computing device is to automatically select the first and second server side devices to process the one or more trade orders for the first tradeable object and the second tradeable object based on a performance parameter of the first server side device and a performance parameter of the second server side device.

10. The system of claim 6, wherein the computing device is to receive a selection command that defines the first and second server side devices to process the one or more trade orders for the first tradeable object and the second tradeable object.

11. The system of claim 6, wherein the first electronic exchange and the second electronic exchange are the same electronic exchange.

12. A non-transitory tangible computer readable storage medium including a set of instructions for execution by a processor, wherein the instructions are executable to:
   receive a trading strategy order, wherein the trading strategy order includes a plurality of legs, wherein a first leg is associated with a first tradeable object and a second leg is associated with a second tradeable object, wherein the trading strategy is to be executed by a plurality of server side devices in a distributed server system;
   select a first server side device of the plurality of server side devices to process one or more trade orders for the first tradeable object associated with the first leg of the trading strategy order and a second server side device of the plurality of server side devices to process one or more trade orders for the second tradeable object associated with the second leg of the trading strategy order such that processing the plurality of legs is distributed among the plurality of server side devices in the distributed server system, wherein the selection of the first server side device is based on a location of the first server side device relative to a first electronic exchange at which the first tradeable object is traded, and wherein the selection of the second server side device is based on a location of the second server side device relative to a second electronic exchange at which the second tradeable object is traded, wherein each of the first server side device and the second server side device are configured to communicate with a trading device and at least one of the first electronic exchange and the second electronic exchange over a computer network, wherein the trading device is configured to process synthetic trade order messages received from at least one of the first server side device and the second server side device; and
   select either the first server side device or the second server side device as a control server based on a location of the selected server side device in the distributed server system, wherein the first server side device and the second server side device are configured to receive synthetic trade order data related to the trading strategy order from the one or more electronic exchanges over a computer network, and wherein the first server side device or the second server side device selected as the control server is configured to report the synthetic trade order data for the trading strategy to the trading device configured to process the synthetic trade data, wherein a non-selected server side device of the first server side device and the second server side device is configured to refrain from sending the received synthetic trade order data to the trading device such that the trading device does not receive a redundant message related to the synthetic trade order data from the first server side device or the second server side device that was not selected as the control server; and
   notify the first server side device or the second server side device of the selection as the control server.

13. The computer readable storage medium of claim 12, wherein the first electronic exchange and the second electronic exchange are the same electronic exchange.

14. The computer readable storage medium of claim 12, wherein the instructions to select the first server side device and the second server side device to process the one or more trade orders for the first tradeable object and the second tradeable object include instructions to automatically select the first and second server side devices.

15. The computer readable storage medium of claim 14, wherein the instructions to select the first server side device and the second server side device to process the one or more trade orders for the first tradeable object and the second tradeable object include instructions to automatically select based on a performance parameter of the first server side device and a performance parameter of the second server side device.

16. The computer readable storage medium of claim 12, wherein the instructions to select the first server side device and the second server side device to process the one or more trade orders for the first tradeable object and the second tradeable object include instructions to receive a selection command that defines the first and second server side devices.

* * * * *